(12) United States Patent
Ueda et al.

(10) Patent No.: US 9,974,233 B2
(45) Date of Patent: May 22, 2018

(54) HARVESTING MACHINE

(71) Applicant: Kubota Corporation, Osaka-shi (JP)

(72) Inventors: Mao Ueda, Sakai (JP); Kazuhiro Takahara, Sakai (JP); Hiroshi Ikeda, Sakai (JP); Hirotsugu Inoue, Sakai (JP); Tadashi Hamanishi, Sakai (JP); Yukihiro Iname, Sakai (JP); Shoma Deguchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days. days.

(21) Appl. No.: 15/315,522

(22) PCT Filed: Apr. 23, 2015

(86) PCT No.: PCT/JP2015/062366
§ 371 (c)(1),
(2) Date: Dec. 1, 2016

(87) PCT Pub. No.: WO2016/047187
PCT Pub. Date: Mar. 31, 2016

(65) Prior Publication Data
US 2017/0188514 A1 Jul. 6, 2017

(30) Foreign Application Priority Data

Sep. 25, 2014 (JP) ................................. 2014-195575
Sep. 26, 2014 (JP) ................................. 2014-197170
(Continued)

(51) Int. Cl.
*A01D 41/127* (2006.01)
*A01D 41/12* (2006.01)
(Continued)

(52) U.S. Cl.
CPC ..... *A01D 41/1275* (2013.01); *A01D 41/1208* (2013.01); *A01D 41/1277* (2013.01);
(Continued)

(58) Field of Classification Search
CPC .............. A01D 41/127; A01D 41/1275; A01D 41/1277; A01D 41/1271; A01D 41/1272;
(Continued)

(56) References Cited

U.S. PATENT DOCUMENTS 5,978,720 A 11/1999 Hieronymus et al.
6,167,337 A * 12/2000 Haack ....................... E02F 9/26
222/63

(Continued)

FOREIGN PATENT DOCUMENTS

JP 10229740 A 9/1998
JP 200232117 A 1/2002
(Continued)

OTHER PUBLICATIONS

International Preliminary Report for related PCT/JP2015/062366 dated Apr. 6, 2017.

*Primary Examiner* — Robert E Pezzuto
(74) *Attorney, Agent, or Firm* — The Webb Law Firm

(57) ABSTRACT

A harvesting machine includes: a crop tank; a measuring device that measures an amount of crop that has been stored in the crop tank; an unloader apparatus that discharges crop that has been stored in the crop tank; a device control part that executes precise measurement oriented device setting processing; a measurement control part including a precise measurement execution part that performs, precise measurement which involves the precise measurement oriented device setting processing, and a simplified measurement execution part that executes, simplified measurement; an operational instruction processing part that outputs a precise
(Continued)

measurement instruction and a simplified measurement instruction in response to an operation performed by a manual operation device; and a measurement result recording part that rewrites a simplified measurement result recorded based on a preceding simplified measurement instruction, with a precise measurement result that is based on a succeeding precise measurement instruction.

24 Claims, 22 Drawing Sheets

(30) Foreign Application Priority Data

Sep. 26, 2014 (JP) .................................. 2014-197177
Sep. 26, 2014 (JP) .................................. 2014-197178

(51) Int. Cl.
*A01F 12/60* (2006.01)
*A01F 12/18* (2006.01)
*A01F 12/46* (2006.01)

(52) U.S. Cl.
CPC .............. *A01F 12/18* (2013.01); *A01F 12/46* (2013.01); *A01F 12/60* (2013.01)

(58) Field of Classification Search
CPC . A01D 41/1273; A01D 41/1208; A01F 12/60; A01F 12/18; A01F 12/46; G01F 1/666; G01F 1/662; G01J 3/02; G01J 3/0291; G01J 3/42; G01N 21/85; G01N 33/0098
USPC ............. 56/10.2 B–10.2 G, 10.2 R; 356/326; 460/1, 4–7; 701/31, 47, 48, 50
See application file for complete search history.

(56) References Cited

U.S. PATENT DOCUMENTS

| | | | |
|---|---|---|---|
| 6,591,145 B1* | 7/2003 | Hoskinson | A01D 41/127 460/1 |
| 8,115,923 B2* | 2/2012 | Priesnitz | G01J 3/02 356/326 |
| 9,043,096 B2* | 5/2015 | Zielke | A01D 41/1275 701/50 |
| 9,629,308 B2* | 4/2017 | Scholer | A01D 41/1272 |
| 9,631,964 B2* | 4/2017 | Gelinske | G01F 1/662 |
| 9,756,785 B2* | 9/2017 | Butts | G01S 17/89 |
| 2009/0251617 A1 | 10/2009 | Hyakudai et al. | |
| 2015/0242799 A1 | 8/2015 | Seki et al. | |

FOREIGN PATENT DOCUMENTS

| | | |
|---|---|---|
| JP | 2005253384 A | 9/2005 |
| JP | 200681485 A | 3/2006 |
| JP | 2006246845 A | 9/2006 |
| JP | 2006254758 A | 9/2006 |
| JP | 200764462 A | 3/2007 |
| JP | 4273025 B2 | 6/2009 |
| JP | 2009253558 A | 10/2009 |
| JP | 2009264703 A | 11/2009 |
| JP | 201136193 A | 2/2011 |
| JP | 2013118856 A | 6/2013 |
| JP | 201468543 A | 4/2014 |
| WO | 2014050524 A1 | 4/2014 |

* cited by examiner

Fig.14
(a)
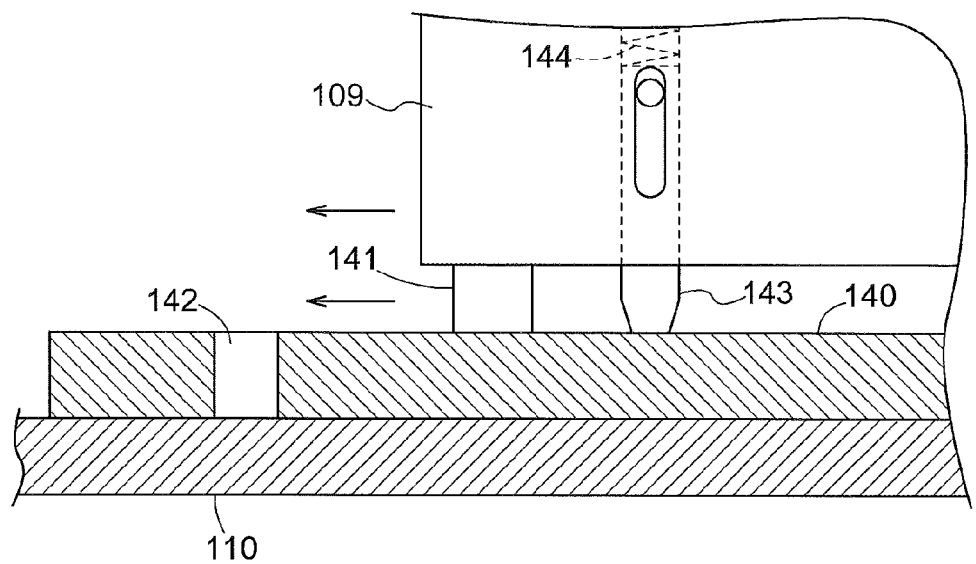
(b)
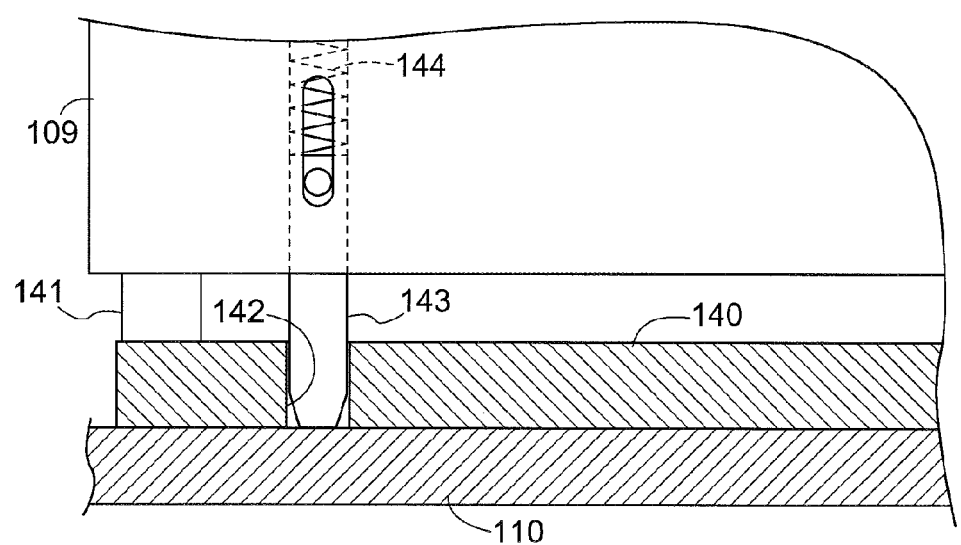

HARVESTING MACHINE

CROSS-REFERENCE TO RELATED APPLICATIONS

This application is the United States national phase of International Application No. PCT/JP2015/062366 filed Apr. 23, 2015, and claims priority to Japanese Patent Application No. 2014-195575 filed Sep. 25, 2014 and Japanese Patent Application Nos. 2014-197178, 2014-197177, and 2014-197170, all filed Sep. 26, 2014, the disclosures of which are hereby incorporated in their entirety by reference.

TECHNICAL FIELD

The present invention relates to harvesting machines such as combines. Harvesting machines include, in addition to combines, crop harvesting machines such as corn harvesting machines. Combines include head-feeding type combines shown in the embodiments described below, and normal type combines (also referred to as whole stalk charging type combines) as well. Combines include crawler travelling type combines, and wheel travelling type combines as well.

BACKGROUND ART

[1] A harvesting machine is configured to temporarily store crops that the harvesting machine has harvested from a farm field while travelling, in a crop tank.

Such a harvesting machine performs harvesting work on one or more farm fields by repeatedly storing crops in the crop tank and discharging crops from the crop tank. In a combine (one example of a harvesting machine) disclosed in JP 2011-036193A (Patent Literature 1), the mass of grain in the crop tank (the yield) is calculated when it has been determined that preparations for precise measurement have been completed, on the grounds that a predetermined period of time (e.g. 10 seconds) has elapsed since an orientation controller of the combine that uses a hydraulic cylinder determined that the orientation, in terms of the inclination, of a travelling machine body is horizontal relative to the right-left direction and the front-rear direction. Although such a combine can accurately measure the mass of grain in the crop tank, it takes a long time to prepare for precise measurement. Therefore, there is demand to perform simplified measurement as well, without preparing for precise measurement.

[2] JP 2014-068543A (Patent Literature 2) discloses a combine that includes: a grain tank that is mounted on a travelling machine body so that grain can be stored therein; and a load cell that measures the weight of the grain tank, and that can calculate the weight of crop in the grain tank. The combine according to Patent Literature 2 includes: the load cell that detects the weight of the grain tank; an inclination sensor that detects the inclination of the travelling machine body; and a yield measuring means that calculates the weight of crop based on a weight detection signal that is inputted from the load cell. In this regard, if the inclination of the machine body detected by the inclination sensor is within a permissible range, an instruction to calculate the weight of crop is outputted to the yield measuring means, and if the inclination of the machine body detected by the inclination sensor is out of the permissible range, the instruction to calculate the weight of crop is not outputted. The travelling machine body that is inclined is restored to the horizontal orientation upon a control instruction being outputted from an orientation correcting means to an orientation control apparatus. Patent Literature 2 discloses control in which whether or not the inclination of the machine body is within the permissible range is checked when the calculated yield is outputted, and if the inclination of the machine body is out of the permissible range, an instruction to restore the horizontal orientation is outputted to the orientation control apparatus.

With the load cell that measures the weight of the contents as well as the weight of the container, an error may occur in the results of measurement of the weight of the contents due to changes in the container over time and changes in a load cell attachment part over time. The zero point adjustment that is disclosed in JP 2009-264703A (Patent Literature 3) is effective for eliminating such an error. A load cell disclosed in Patent Literature 3 is for measuring the weight of a drying apparatus included in drying equipment, and is provided on the upper side of a frame member that is made of a sheet metal and that is fixed to the surface of the floor of a building. Therefore, this load cell is always maintained in the horizontal orientation unlike the load cell provided for the combine disclosed in Patent Literature 2 that can change orientation, and it is unnecessary to consider the inclination of the orientation in the zero point adjustment.

[3] As a combine that reaps stalks from a farm field and performs threshing while travelling, and measures the quality of grain when storing grain thus obtained in a grain tank, there is a conventional combine that is disclosed in JP 2013-118856A (Patent Literature 4).

In this combine, a receiving and holding part that makes a grain storage space for temporarily storing grain fed to a grain tank is formed, and the internal quality of grain that has been stored in the grain storage space is measured by an optical internal quality measurement apparatus. The bottom surface of the receiving and holding part is formed using a bottom plate (a shutter) that swings to open and close. Grain is temporarily stored when the bottom plate is in a closed state, and the grain temporarily stored is discharged when the bottom plate is in an open state. A supply (storage) state detection sensor that detects that a predetermined amount or more of grain has been stored is provided at an inner upper end portion of the receiving and holding part. In a lower area of the receiving and holding part, a grain presence (grain level) sensor that detects whether or not grain is present at the level of height of the grain presence (grain level) sensor is provided on a side wall of the crop tank, at a position that is slightly lower than the lower end position of the bottom plate in the open state. Measurement processing using the internal quality measurement apparatus is performed each time the supply state detection sensor detects that a predetermined amount or more of grain has been supplied to the receiving and holding part. Thereafter, the bottom plate is switched to the open state, and the grain is discharged. Then, the bottom plate is restored to the closed state again, and grain is stored. As a result of an increase in the amount of grain in the grain tank, the top end of the bottom plate is eventually embedded in the grain, and it becomes impossible to switch the bottom plate from the open state to the closed state. Therefore, measurement processing is cancelled upon the presence of grain being detected by the grain presence sensor.

PRIOR ART

Patent Literature

Patent Literature 1: Japanese Patent Unexamined Publication No. 2011-036193 (JP 2011-036193A)

Patent Literature 2: Japanese Patent Unexamined Publication No. 2014-068543 (JP 2014-068543A)
Patent Literature 3: Japanese Patent Unexamined Publication No. 2009-264703 (JP 2009-264703A)
Patent Literature 4: Japanese Patent Unexamined Publication No. 2013-118856 (JP 2013-118856A)

SUMMARY OF THE INVENTION

Problem to be Solved by the Invention

[1] A problem corresponding to Background Art [1] is as follows.

In view of the above-described situation, there is demand for a harvesting machine that can smoothly measure the amount of crop stored in a crop tank by performing either precise measurement or simplified measurement depending on the user's demand at the time.

[2] A problem corresponding to Background Art [2] is as follows.

In view of the above-described situation, there is demand for a combine that can efficiently perform the zero point adjustment for a load cell that measures the weight of a grain tank that is mounted on a machine body that changes the orientation thereof.

[3] A problem corresponding to Background Art [3] is as follows.

According to Patent Literature 4, a grain level sensor that is constituted by a capacitance type proximity sensor is provided on a side wall of the grain tank, and there is the possibility of an error occurring due to the influence of the flow of grain flying out from the inlet port of the grain tank. Therefore, there is demand for a configuration in which the grain level sensor is unlikely to be affected by the flow of grain flying out from the inlet port.

[4] Another problem corresponding to Background Art [3] is as follows.

According to Patent Literature 4, whether or not a predetermined amount or more of grain sufficient for quality measurement has been stored in the receiving and holding part is detected by the storage state detection sensor, and if a failure occurs in this storage state detection sensor, it is impossible to perform quality measurement. Therefore, there is demand for technology for promptly and reliably detecting a failure in the storage state detection sensor.

Solution to the Problem

[1] The following is proposed as a solution corresponding to Problem [1].

A harvesting machine includes: a crop tank that temporarily stores crops that the harvesting machine has harvested while travelling over a farm field; a measuring device that measures an amount of crop that has been stored in the crop tank; and an unloader apparatus that discharges crop that has been stored in the crop tank to an outside. As a control system, the harvesting machine includes: a device control part that executes precise measurement oriented device setting processing to create a device state that allows the measuring device to perform precise measurement; and a measurement control part, the measurement control part including: a precise measurement execution part that performs, by the measuring device, precise measurement which involves the precise measurement oriented device setting processing; and a simplified measurement execution part that executes, by the measuring device, simplified measurement which does not involve the precise measurement oriented device setting processing. The harvesting machine also includes: an operational instruction processing part that outputs a precise measurement instruction to perform precise measurement and a simplified measurement instruction to perform simplified measurement, in response to an operation performed by using a manual operation device; and a measurement result recording part that, before the unloader apparatus performs crop discharging work, rewrites a simplified measurement result that has been recorded based on a preceding simplified measurement instruction, with a precise measurement result that is based on a succeeding precise measurement instruction.

With this configuration, the measurement control part that controls the measurement of the amount of stored crop using the measuring device includes the precise measurement execution part and the simplified measurement execution part. Therefore, it is possible to measure the amount of stored crop (the yield) by using a desired measurement method, by providing a precise measurement instruction to the measurement control part if precise measurement is desired, and providing a simplified measurement instruction to the measurement control part if simplified measurement is desired. In regard to precise measurement, prior to actual measurement, a device state that allows for precise measurement (e.g. a static stable state of the vehicle body) is created, and then measurement is executed. Measurement of the amount of crop that has been stored in the crop tank (also referred to as the yield) is usually performed before the unloader apparatus performs crop discharging work. In this regard, when precise measurement is desired after first performing simplified measurement by providing a simplified measurement instruction, if crop has not been discharged by the unloader apparatus, it is possible to execute precise measurement by providing a precise measurement instruction. Furthermore, in regard to measurement records, the measurement result of the preceding simplified measurement is rewritten with the measurement result of the succeeding precise measurement. This is preferable because, even if both simplified measurement and precise measurement have been performed, the measurement result of precise measurement has been recorded at the time of integration of the measurement results that is performed after harvesting work.

As the manual operation device that is used by the driver (the operator) to select either precise measurement or simplified measurement, a configuration in which switches (that may be buttons or dials) for precise measurement and simplified measurement are independently provided may be employed, and alternatively, a configuration in which switches that serve as other functional switches (that may be buttons or dials) may be employed. In one preferable embodiment corresponding to the former case, the manual operation device includes a simplified measurement switch that transmits a signal for outputting a simplified measurement instruction to the operational instruction processing part, and a precise measurement switch that transmits a signal for outputting a precise measurement instruction to the operational instruction processing part. This configuration allows the operator to operate a switch while clearly distinguishing between simplified measurement and precise measurement. Therefore, it is possible to prevent a wrong switch from being selected. In one preferable embodiment corresponding to the latter case, the simplified measurement switch also serves as an activation switch for the unloader apparatus. Therefore, for example, a signal for outputting a simplified measurement instruction is sent out upon multiple operations being performed with the activation switch, and a signal that requests activation of the unloader apparatus is sent out upon a single operation being performed with the activation switch. Considering the fact that measurement of the amount of the stored crop is often paired with crop export work that is performed by the unloader apparatus as part of a series of work, the configuration in which the simplified measurement switch also serves as an activation switch for unloader apparatus provides the advantage that it is possible to smoothly perform the series of operations to perform simplified measurement and crop export work that are performed in a short period of time.

In one preferable embodiment, during the precise measurement oriented device setting processing, one, some or all of: a process of changing an orientation of a vehicle body of the harvesting machine to a horizontal orientation; a process of blocking a driving force to a device for harvesting work; and a process of fixing a device for unloading work at a storage position is/are executed. With this configuration, as a result of changing the orientation of the vehicle body of the harvesting machine to the horizontal orientation, the crop tank takes on a stable orientation that is suitable for measurement. As a result of blocking a driving force to the device for harvesting work, vibrations are prevented from being transmitted to the tank and the measuring device. As a result of fixing the device for unloading work at the storage position, measurement is stabilized due to the stabilized center of gravity of the vehicle body. Consequently, the reliability of precise measurement is improved.

If the amount of stored crop is calculated from a measurement value that is outputted from the measuring device, a conversion table is required in order to derive the yield from the measurement value. In this regard, in cases where the conversion table varies depending on the type of crop, and in cases where identification data that specifies the type of crop is added as an attribute value of the yield, it is necessary to reliably specify the crop that is being harvested. Such crops vary depending on season or year, and thus, in recent years, accurate information regarding crop has been registered in a management center. Therefore, in one preferable embodiment, a conversion table for deriving a yield that is an amount of crop that has been stored in the crop tank, from a measurement value obtained by the measuring device, is built based on data that is transmitted from a management center via a data communication network in response to identification information regarding a farm field that is a harvesting target. In this regard, appropriate data is transmitted from the management center to the control part of the harvesting machine upon the identification information regarding the farm field that is the harvesting target being provided to the management center.

If the crop is rice, wheat or corn, it is necessary to transport the crop that has been stored in the crop tank to the outside by using the unloader apparatus, several times during harvesting work for one farm field. Therefore, in one preferable embodiment, the harvesting machine further includes a display part that displays both: a unit yield that is an amount of crop that has been stored in the crop tank and being calculated from a result of measurement performed by the measuring device; and an integrated yield that is an integration of unit yields. This configuration allows the driver to check the yield of the stored crop at each instance of discharge work, and after completion of harvesting work for one farm field, the driver is able to check the total yield of the farm field.

[2] The following is proposed as a solution corresponding to Problem [2].

A combine including: a travelling machine body; an orientation changing mechanism that changes an orientation of the travelling machine body; a grain tank that is mounted on the travelling machine body and stores grain that has been transported from a threshing apparatus; an unloader apparatus that discharges grain that has been stored in the grain tank to an outside from a bottom part of the grain tank; a load cell that measures a weight of the grain tank; a yield measurement part that measures a yield of grain that has been stored in the grain tank, based on a result of measurement performed by the load cell; a zero point adjustment part that performs zero point adjustment processing for the yield measurement part; and a horizontal orientation control part that controls the orientation changing mechanism upon zero point adjustment processing being started by the zero point adjustment part, so as to bring the travelling machine body into a horizontal orientation.

With this configuration when zero point adjustment is performed on the yield measurement part that uses the load cell, horizontal control using the orientation changing mechanism is performed at the beginning of zero point adjustment processing, and the travelling machine body is brought into the horizontal orientation. Consequently, it is possible to prevent a problem in which zero point adjustment including an error is performed, with the travelling machine body still in an inclined orientation, and the subsequent yield measurement is performed based on the zero point adjustment including this error.

In one preferable embodiment, the unloader apparatus includes: a bottom part screw that is provided on the bottom part of the grain tank; a vertical transport screw conveyer that conveys grain that has been exported by the bottom part screw, in an upward direction; and a horizontal transport screw conveyer that is swingable in a top-bottom direction relative to the vertical transport screw conveyer, the unloader apparatus further including a holding apparatus that fixes the horizontal transport screw conveyer at a home position, and the holding apparatus fixes the horizontal transport screw conveyer at the home position upon the zero point adjustment processing being started by the zero point adjustment part. In the case where the above-described unloader apparatus is mounted on the combine in order to discharge grain that has been stored in the grain tank to the outside, if the lateral screw conveyer is not fixed by the holding apparatus, at the home position at which the lateral screw conveyer is most stable, there is the possibility of the travelling vehicle body being unstable. Zero point adjustment performed in such a state is more likely to be inaccurate. This problem can be solved by using a configuration in which the lateral screw conveyer is automatically fixed at the home position upon zero point adjustment processing being started.

If the lateral screw conveyer is not fixed at the home position, an offset load that hinders accurate measurement may be applied to the grain tank. The lateral screw conveyer is configured to swing in the top-bottom direction, and is elongated and heavy because it is required that the lateral screw conveyer has a discharging point, from which grain is discharged, at a position that is distanced from the travelling machine body. Therefore, it is preferable that the lateral screw conveyer is fixed by the holding apparatus by utilizing gravity that is generated by the weight of the lateral screw conveyer. Therefore, in one preferable embodiment, the horizontal transport screw conveyer uses hydraulic pressure to swing in the top-bottom direction, and the holding apparatus uses a gravity fitting method under a condition where hydraulic pressure has been released, to fix the horizontal transport screw conveyer. With this configuration, the self-weight of the lateral screw conveyer is ultimately used to fix the lateral screw conveyer, and the configuration of the holding apparatus is simple. One specific configuration that uses a gravity fitting method under a condition where hydraulic pressure has been released is a configuration in which, preferably, a spindle-shaped protruding part and a recessed part that corresponds to the protruding part are provided for the horizontal transport screw conveyer and the holding apparatus, and the horizontal transport screw conveyer is lifted once using hydraulic pressure. After the hydraulic pressure is released, with its own weight, the two parts engage with each user. Therefore, in one preferable embodiment of the present invention, if the horizontal transport screw conveyer is located at the home position when the zero point adjustment processing is started by the zero point adjustment part, the horizontal transport screw conveyer is first caused to swing upward using hydraulic pressure, and is then fixed to the holding apparatus using the gravity fitting method under a condition where hydraulic pressure has been released. Consequently, the lateral screw conveyer is reliably brought into a stable orientation before the zero point adjustment is actually performed.

In one preferable embodiment, the horizontal orientation control part controls the orientation changing mechanism upon completion of the zero point adjustment processing, thereby bringing the travelling machine body into a lower limit orientation in which a height of the travelling machine body relative to a ground is the lowest. Upon completion of zero point adjustment processing and the occurrence of transition to travelling for reaping/threshing work, the orientation changing mechanism performs control so that the surface of the farm field and the travelling machine body become parallel. The lower limit orientation in which the height of the travelling machine body relative to the ground is the lowest is suitable as a reference starting orientation for this control. Also, since the travelling machine body is brought into the lower limit orientation every time zero point adjustment processing has been completed, the driver can be aware that the zero point adjustment processing has been completed.

At the time of factory shipment, the above-described zero point adjustment is performed under a measurement environment that is most appropriate for adjustment. The measurement environment for the zero point adjustment that is performed after shipment is often worse than the measurement environment for the zero point adjustment at the time of factory shipment. Therefore, the zero point adjustment after shipment does not work well in some cases. Considering this fact, it is preferable that the zero point adjustments under the two measurement environments are distinguished from each other. In one preferable embodiment, the zero point adjustment processing includes: basic zero point adjustment processing that is performed before factory shipment; and temporary zero point adjustment processing that is performed after factory shipment; and a temporary zero point adjustment parameter that is calculated as per the temporary zero point adjustment processing is replaced with a basic zero point adjustment parameter that is calculated as per the basic zero point adjustment processing. In this regard, since the basic zero point adjustment parameter is more important than the temporary zero point adjustment parameter, it is preferable that the basic zero point adjustment parameter will be set again even if the temporary zero point adjustment parameter is temporarily set instead of the basic zero point adjustment parameter. Therefore, in one preferable embodiment, the basic zero point adjustment parameter is recorded on a memory before being replaced with the temporary zero point adjustment parameter, and the basic zero point adjustment parameter is set again upon the temporary zero point adjustment parameter being reset.

[3] The following is proposed as a solution corresponding to Problem [3].

A combine including: a grain tank that stores grain that has been transported from a threshing apparatus; and a grain discharging apparatus that discharges grain that has been stored in the grain tank to an outside from a bottom part of the grain tank, and a tube-shaped member is provided inside the grain tank. The tube-shaped member forms a grain path, and the grain path has: an inlet port that is an upper port for taking in some of the grain that has been transported from the threshing apparatus; and a discharge port that is a lower port for discharging the grain that has been taken in from the inlet port to the grain tank. A temporary storage part is provided halfway of the grain path, and a storage shutter is provided for the temporary storage part. The storage shutter is movable between: a closed position for storing, at which the storage shutter takes on a horizontal orientation in order to store grain that has been taken in from the inlet port of the temporary storage part; and an open position for discharging, at which the storage shutter takes on a downward orientation in order to discharge the stored grain from the temporary storage part. The combine includes: a grain level detector that is provided in the grain path and detects that a below-shutter distance has reached a predetermined value, the below-shutter distance being a distance between a lower end of the storage shutter in the downward orientation and an upper surface of the grain that has been stored in the grain tank; and a quality measurement part that detects quality of grain that has been stored in the temporary storage part. Furthermore, the combine includes a shutter control part that controls a position changing operation of the storage shutter, and stops the position changing operation of the storage shutter based on a detection signal from the grain level detector.

Upon starting reaping and threshing work, as grain that has been transported from the threshing apparatus and discharged from the inlet port of the grain tank is stored in the grain tank, the upper surface level of the grain gradually rises toward the storage shutter from below. With this configuration, the grain level detector that detects the upper surface level of grain that hinders the operation of the storage shutter is provided in the grain path. Specifically, the grain level detector is provided inside the tube-shaped member, and the tube-shaped member serves as a protection cover. Consequently, the grain level detector is unlikely to be affected by the flow of grain flying out from the inlet port of the grain tank.

In one preferable embodiment, the tube-shaped member has: a first wall that faces toward a central part of the grain tank; and a second wall that faces a wall member of the grain tank, and the storage shutter is a swing shutter that swings about a swing shaft that is supported by the first wall, and the grain level detector is provided on the first wall. When the storage shutter is at the open position for discharging, at which the storage shutter takes on a downward orientation, if the lower end of the storage shutter thrusts into the grain that has been stored in the grain tank, the storage shutter stops operating. Therefore, it is important to detect the upper surface level of the grain in the vicinity of the lower end of the storage shutter in the downward orientation. With this configuration, the lower end of the storage shutter in the downward orientation approaches the first wall, and therefore it is possible to accurately detect the upper surface level of the grain in the vicinity of the lower end, using the grain level detector that is provided on the first wall.

In one preferable embodiment, the grain level detector has a detection surface that is flat, and the grain level detector is provided such that the detection surface is flush with the first wall. With this configuration, the grain level detector does not protrude to the grain path, and therefore grain that falls along the grain path is prevented from being damaged by the grain level detector.

In one preferable embodiment, a second grain level detector is provided in the grain path and detects that the below-shutter distance has reached a predetermined value that is different from the predetermined value. With this configuration, there are two grain level detectors including the aforementioned grain level detector, and therefore it is possible to more reliably detect the upper surface level of the grain.

In the case where two grain level detectors are provided in this way, it is possible to effectively address trouble in which a failure occurs in one of the grain level detectors, by setting the second grain level detector so as to detect the same upper surface level as the first grain level detector (the predetermined value that serves as a reference value for detecting that the below-shutter distance has been reached is the same for the two grain level detectors).

On the other hand, if the upper surface level of the grain that is detected by the first grain level detector and the upper surface level of the grain that is detected by the second grain level detector are different from each other (the predetermined value that serves as a reference value for detecting that the below-shutter distance has been reached is different for the two grain level detectors), the results of detection can be separately used for a warning and for an emergency alarm.

In both configurations, in order to obtain the same advantage as that of the aforementioned grain level detector (the first grain level detector), it is preferable that the second grain level detector is also provided in the grain path.

If the first grain level detector and the second grain level detector are provided in the grain path facing each other, it is possible to estimate the inclination of the upper surface level of the grain that has entered the grain path, based on signals from the two grain level detectors. This estimation of the inclination of the upper surface level of the grain allows the storage shutter to be driven until the last possible moment before the grain enter the trajectory of swing of the storage shutter so that grain quality measurement can be performed.

[4] The following is proposed as a solution corresponding to Problem [4].

A combine including: a grain tank that stores grain that has been transported from a threshing apparatus; a grain discharging apparatus that discharges grain that has been stored in the grain tank to an outside from a bottom part of the grain tank; a grain path that is provided inside the grain tank, and has: an inlet port that is an upper port for taking in some of the grain that has been transported from the threshing apparatus; and a discharge port that is a lower port for discharging the grain that has been taken in from the inlet port to the grain tank; a temporary storage part that is located halfway of the grain path; a storage shutter that is provided for the temporary storage part, and that is movable between: a closed position for storing, at which the storage shutter stores the grain taken in from the inlet port in the temporary storage part; and an open position for discharging, at which the storage shutter discharges the stored grain from the temporary storage part; a storage amount detector that outputs a storage complete signal upon an amount of grain that has been stored in the temporary storage part reaching a predetermined amount; a quality measurement part that detects quality of grain that has been stored in the temporary storage part; a shutter control part that controls a position changing operation of the storage shutter; a yield measuring device that measures a yield of grain that has been stored in the grain tank; and a failure determination part that determines that a failure has occurred in the storage amount detector, based on a fact that the storage amount detector has not outputted the storage complete signal despite the amount of grain that has been stored in the temporary storage part, estimated based on a result of measurement by the yield measuring device, having exceeded the predetermined amount.

With this configuration, the storage amount detector outputs a storage complete signal upon the amount of grain that has been stored in the temporary storage part reaching, for example, the predetermined amount that is the amount suitable for the quality measurement part to detect the quality of the grain. Using this fact, the amount of grain that has been stored in the temporary storage part, i.e. the storage amount, in a normal case is estimated based on the result of measurement by the yield measuring device. Therefore, if the storage amount detector has not outputted a storage complete signal despite the estimated storage amount being far beyond the predetermined amount that has been set in advance, the failure determination part can determine that a failure has occurred in the storage amount detector.

In one preferable embodiment, the combine further includes a shutter position detector that detects a positional change of the storage shutter, and the failure determination part determines that a failure has occurred in the storage amount detector based on a result of measurement over time by the yield measuring device and a result of detection by the shutter position detector. With this configuration, the shutter position detector can accurately detect the time at which the storage shutter reaches the closed position for storing when grain starts to be stored in the temporary storage part. Consequently, it is possible to more immediately and more accurately detect that a failure has occurred in the storage amount detector.

In one preferable embodiment, the failure determination part determines that a failure has occurred in the storage shutter, based on a fact that the shutter position detector has not detected a positional change of the storage shutter despite a control signal that instructs the storage shutter to perform a position changing operation being outputted from the shutter control part. Therefore, it is possible to address a problem in which an appropriate signal is not outputted from the storage amount detector due to an operational failure of the storage shutter. For example, with respect to a phenomenon in which grain is not stored in the temporary storage part due to the storage shutter being unable to be moved to the closed position for storing, it is possible to distinguish between a failure that has occurred in the storage shutter and a failure that has occurred in the storage amount detector.

In one preferred embodiment, the failure determination part determines that a failure has occurred in the storage amount detector, based on a fact that an increase in the yield, from when the storage shutter was moved to the closed position for storing, has reached a predetermined amount. An increase in the amount of grain that flows into the grain tank can be calculated based on the result of measurement of the yield. Therefore, if the increase is an amount at which a storage complete signal should be outputted from the storage amount detector, it is possible to determine that a failure has occurred in the storage amount detector. Also, the proportion of the amount of grain that passes through the grain path to the amount of grain that is discharged from the inlet port can be calculated in advance. Therefore, the relationship between the increase in the amount of grain and the amount of grain stored in the temporary storage part can be expressed as a function or a table. Therefore, if a storage complete signal is not outputted despite the increase in the amount of grain in the grain tank, from when the storage shutter is closed, being far beyond the value corresponding to the predetermined amount at which the storage amount detector should output the storage complete signal, it can be determined that a failure has occurred in the storage amount detector.

In another preferable embodiment, the failure determination part determines that a failure has occurred in the storage amount detector, based on a fact that the storage amount detector continues outputting the storage complete signal despite the storage shutter having moved from the closed position for storing to the open position for discharging. Specifically, if the storage amount detector continues outputting a storage complete signal despite the storage shutter having been moved from the closed position for storing to the open position for discharging and grain having been discharged from the temporary storage part, the failure determination part can determine that a failure has occurred in the storage amount detector.

Other features and advantageous effects achieved by the features will become apparent from reading the following description with reference to the accompanying drawings. In the following description, the direction in which the travelling machine body of the harvesting machine (the combine) moves back and forth is referred to as a front-rear direction, the horizontal direction that is orthogonal to the front-rear direction is referred to as a right-left direction, and the direction that is orthogonal to the front-rear direction and the right-left direction is referred to as a top-bottom direction, unless specified otherwise.

BRIEF DESCRIPTION OF THE DRAWINGS

FIG. 14 is a schematic diagram showing a relationship between a rear stay and a lock pin;

EMBODIMENTS OF THE INVENTION

First Embodiment

First, a first embodiment will be described.

Figure 1:
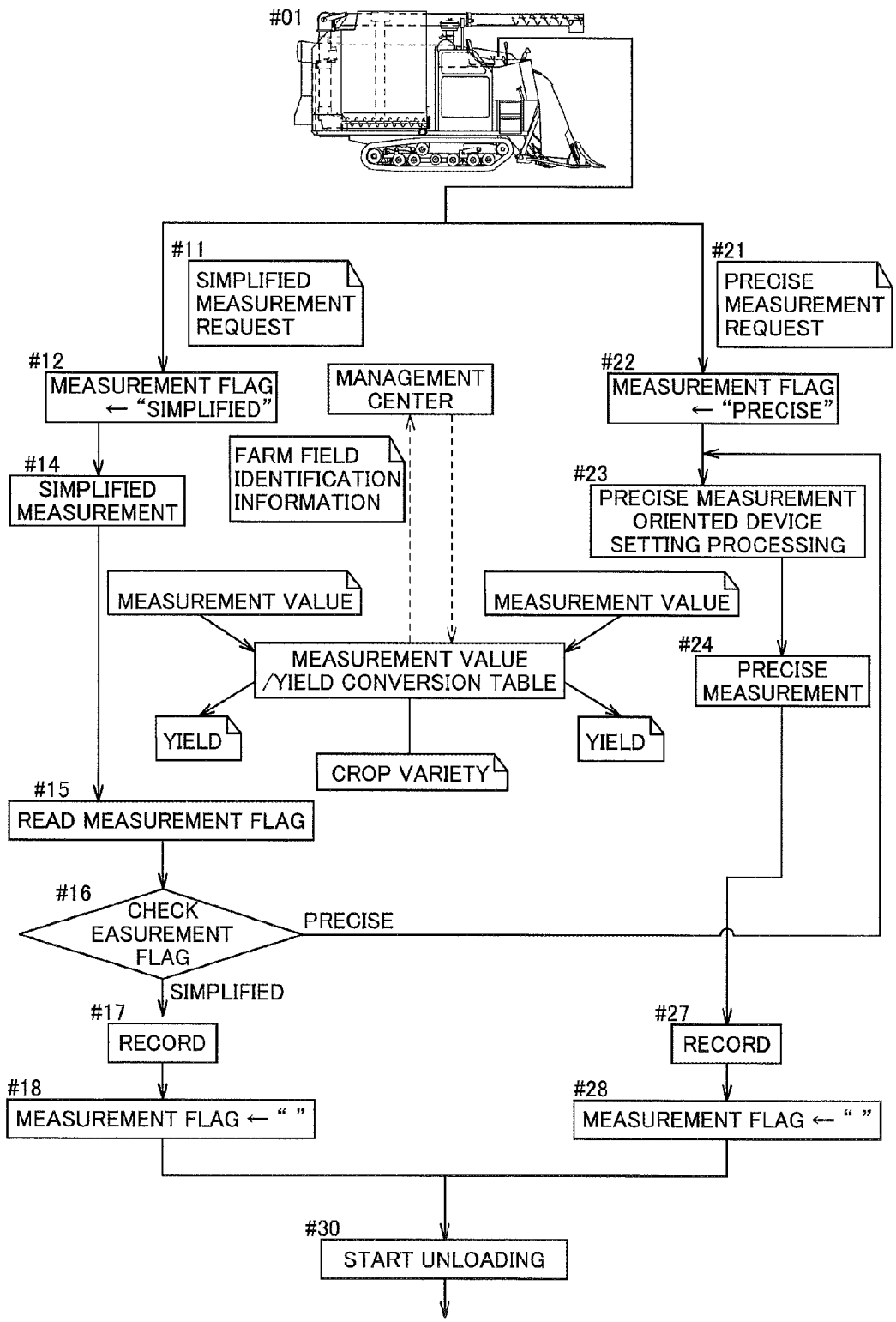
FIG. 1 is a diagram showing a first embodiment of the present invention (the same applies to the following drawings up to FIG. 6), and is a schematic diagram illustrating a basic control flow including simplified measurement control and precise measurement control.

Before specific description of this embodiment, a basic principal of control for calculating the amount of crop stored in a crop tank before the crop is discharged by an unloader apparatus will be described with reference to FIG. 1. FIG. 1 shows a harvesting machine for harvesting crops such as wheat and rice. As is well known, this harvesting machine includes: a crop tank (a grain tank) that temporarily stores crop (grain); and an unloader apparatus that discharges the crop stored in the crop tank. A measuring device that measures the amount of crop stored in the crop tank is provided near the crop tank.

To measure the amount of crop stored in the crop tank, two methods, namely precise measurement and simplified measurement, can be employed. In precise measurement, in order to prevent devices provided for the harvesting machine from causing disturbance, and to prevent a measurement error of the measuring device from occurring due to disturbance as much as possible, precise measurement oriented device setting processing is performed for the devices so that, for example, a stopped state of a driving device, and a stable state of a balancing device in terms of the orientation, are realized. As a result, the number of devices that may cause disturbance for the measuring device is reduced, and a state that is suitable for precise measurement is created. In simplified measurement, part of or all of the above-described precise measurement oriented device setting processing is omitted. Therefore, with simplified measurement, although accurate measurement as is the case with precise measurement cannot be expected, the time required for measurement is reduced due to the omission of precise measurement oriented device setting processing.

Selection between precise measurement and simplified measurement is performed by operating a manual operation device that is provided in the vicinity of a driver's seat (#01). The manual operation device can be constituted by a switch, a button, a lever or the like. However, if a display device such as a liquid crystal panel is provided, the manual operation device may be a software button displayed on the display screen of the display device. An operation performed on the software button is inputted via a touch panel. If the driver selects simplified measurement by using the manual operation device, a simplified measurement request is outputted (#11), and if the driver selects precise measurement, a precise measurement request is outputted (#21). The requests are provided to a measurement control system.

In the measurement control system, upon the simplified measurement request being received, "simplified" is set to a measurement flag (#12), and simplified measurement is executed (#14). In simplified measurement, the measuring device promptly operates to measure the weight of the crop including the crop tank, and to output a measurement value as a measurement result. The measurement value thus obtained is converted into a yield by using a measurement value/yield conversion table. Note that the measurement value/yield conversion table may vary for different models of harvesting machines, different varieties of crops and so on. Therefore, the driver transmits the identification information regarding the harvesting machine and the identification information regarding the farm field that is the harvesting area, to a management center in advance, and downloads a measurement value/yield conversion table that can be appropriately used for the current harvesting work, via a communication network. If the measurement value/yield conversion table to be downloaded includes information regarding the farm field name, the crop variety and so on, these pieces of information can be linked with the calculated yield, as yield attribute values.

The measurement flag is repeatedly read until the completion of simplified measurement (#15), and the content thereof is checked (#16). The reading of the measurement flag and the checking of the content of the measurement flag are repeated until the start of unload work. This procedure is performed to address the situation in which the driver first selects simplified measurement, and then re-selects precise measurement. In both the case of re-selection and the case of first selection, if the driver selects precise measurement by using the manual operation device, a precise measurement request is outputted (#21), and is provided to the measurement control system. As a result, "precise" is set to the measurement flag (#22). Therefore, if simplified measurement is selected first and then precise measurement is selected, the content of the measurement flag is changed from "simplified" to "precise". Consequently, when the checking of the content of the measurement flag is performed in step #16, if the content of the measurement flag is "precise", a jump to step #23 occurs and precise measurement oriented device setting processing is performed, and then precise measurement is performed (#24). As a matter of course, if precise measurement is selected from the beginning, steps #21, #22 and #23 are sequentially performed and then precise measurement is performed (#24).

In precise measurement oriented device setting processing performed in step #23, for example, the vehicle body is stopped, the orientation of the vehicle body is changed to be horizontal, work devices including the unloader apparatus are fixed in a stable orientation, and the driving device is stopped, and thus causes of disturbance in measurement are removed as much as possible. Precise measurement mentioned here means measurement in a situation where disturbance in measurement has been reduced, and does not differ from simplified measurement in terms of how the measurement is performed.

When the checking of the content of the measurement flag is performed in step #16, if the content of measurement flag is "simplified", the yield obtained by simplified measurement is recorded on a memory (#17), and the content of the measurement flag is set to " " (null) (#18). In terms of data analysis after harvesting work, it is favorable that, when the yield is recorded, a type code that specifies that the measurement that has been executed is simplified measurement, a farm field identification code and so on are recorded as well as data indicating the yield. Note that yields obtained through instances of unload work, which are recorded on the memory, are integrated for each farm field so as to be displayable as an integrated yield per farm field, and are recorded for later use.

In precise measurement as well, the calculated yield is recorded on the memory (#27), and the content of the measurement flag is set to " " (null) (#28). Also in this case, when the yield is recorded, a type code that specifies that the measurement that has been executed is precise measurement, a farm field identification code and so on are recorded as well as data indicating the yield.

Upon the completion of yield measurement, exporting work (unload work) is started in order to carry the crop stored in the crop tank to the outside (e.g. to a truck), using the unloader apparatus (#30).

Figure 2:
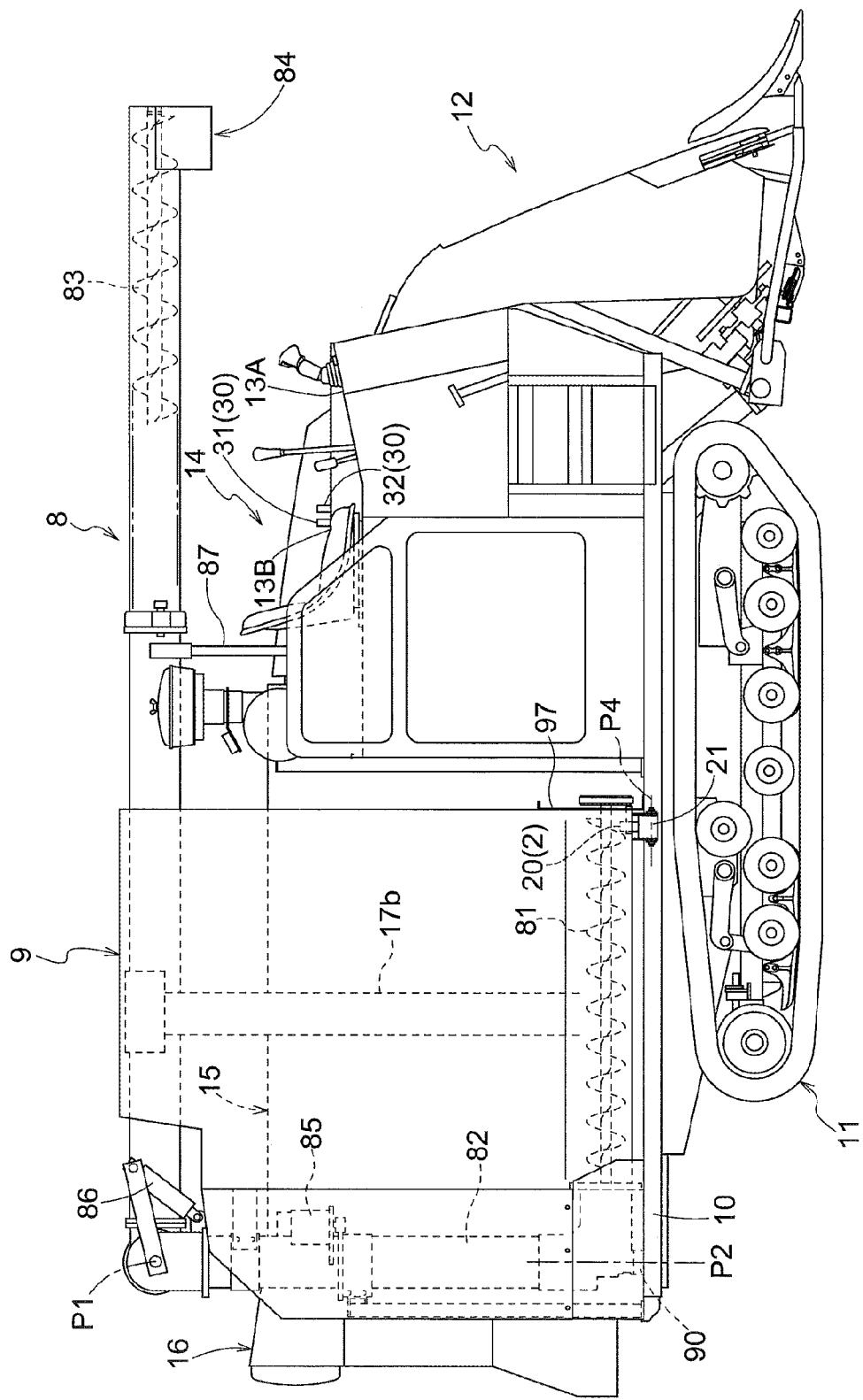
FIG. 2 is a side view of a combine that is an example of a harvesting machine.
Figure 3:
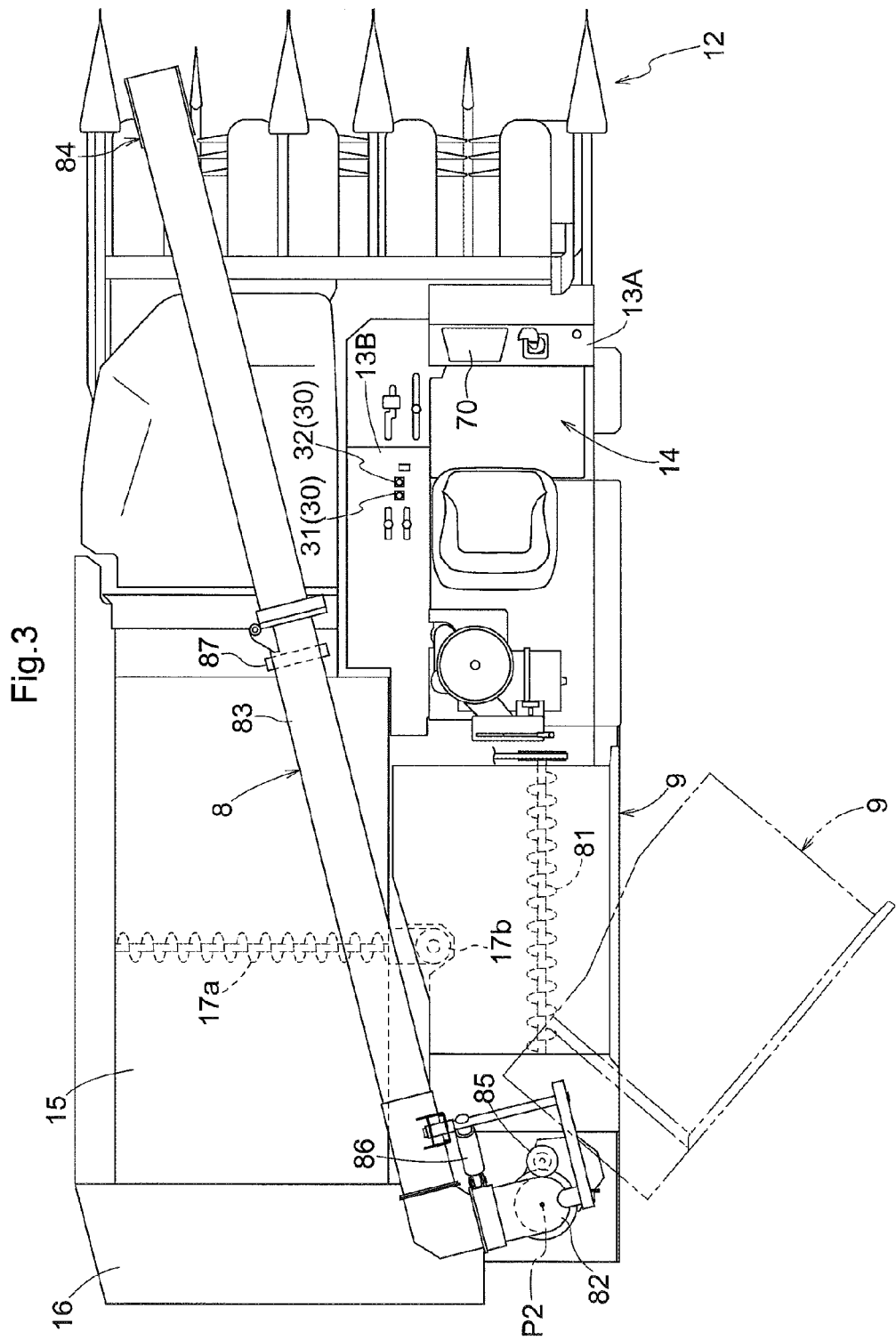
FIG. 3 is a plan view of the combine.

Next, one specific embodiment of the harvesting machine will be described with reference to the drawings. FIG. 2 is a side view of a combine that is an example of the harvesting machine, and FIG. 3 is a plan view of the same. This combine is a head-feeding type combine, and a machine body frame 10 that constitutes the machine body is supported over the ground by a pair of right and left crawler travelling apparatuses 11. A reaping part 12 that reaps planted stalks and transports the reaped stalks rearward of the machine body is provided on a front part of the machine body, and a manipulation part 14 that includes a front console 13A and a side console 13B is provided rearward of the reaping part 12. Furthermore, a threshing apparatus 15 that performs the threshing/separation of the reaped stalks, a grain tank (one example of a crop tank) 9 that stores grain that has been subjected to separation and collection by the threshing apparatus 15, an unloader apparatus 8 that discharges grain from the grain tank 9, a waste straw processing apparatus 16 that processes waste straw and so on are arranged. As shown in FIG. 3, the front console 13A includes a manipulation lever, a transmission lever, and a liquid crystal panel 70 that serves as a display device for displaying various kinds of information. The side console 13B includes manual operation devices 30 used for selecting either precise measurement or simplified measurement for yield measurement. In this embodiment, a simplified measurement switch 31 that sends out a signal for outputting a simplified measurement instruction, and a precise measurement switch 32 that sends out a signal for outputting precise measurement instruction are separately provided.

The threshing apparatus 15 performs threshing processing on the ear tip side of the reaped stalks that have been transported from the reaping part 12, performs separation between: individual grains that have been separated from each other; and dust such as straw dust, through the separating action of a separation mechanism (not shown) that is provided in the threshing apparatus 15, and transports the individual grains to the grain tank 9 as the crop. Waste straw that has undergone threshing processing is subjected to shredding processing in the waste straw processing apparatus 16.

As can be understood from FIGS. 2 and 3, a grain transport mechanism for feeding grain from the threshing apparatus 15 to the grain tank 9 is provided. This grain transport apparatus is constituted by: a first-crop collection screw 17a that is provided on a bottom part of the threshing apparatus 15; and a grain elevator apparatus 17b that is of a screw conveyer type. The grain that has been laterally transported by the first-crop collection screw 17a is transported upward by the grain elevator apparatus 17b, and is fed to the inside of the grain tank 9 via an input port that is formed in an upper part of the grain tank 9. Although not shown in the drawings, a rotary vane that flips the grain toward the inside of the grain tank 9 is provided in an upper end area of the grain elevator apparatus 17b so that grains are distributed as uniformly as possible in the horizontal direction in the grain tank 9.

The unloader apparatus 8 includes: a bottom part screw 81 that is provided on a bottom part of the grain tank 9; a vertical transport screw conveyer 82 that is provided on a side of the grain tank 9 that is rearward of the machine body; and a horizontal transport screw conveyer 83 that extends over the threshing apparatus 15. Grain stored in the grain tank 9 is fed from the bottom part screw 81 to the horizontal transport screw conveyer 83 via the vertical transport screw conveyer 82, and is discharged to the outside from a discharge port 84 that is provided at the front end of the horizontal transport screw conveyer 83. The vertical transport screw conveyer 82 is configured to be rotatable about a vertical axis P2 using the operation of an electrical motor 85, and the horizontal transport screw conveyer 83 is configured to be swingable in the top-bottom direction about a horizontal axis P1 at a base end part using a hydraulic cylinder 86. With this configuration, it is possible to position the discharge port 84 of the horizontal transport screw conveyer 83 so that grain can be discharged to a transportation truck or the like outside the machine. The home position of the horizontal transport screw conveyer 83 (the home position of the unloader apparatus 8) is a position in which the horizontal transport screw conveyer 83 is substantially horizontal and the entirety of the horizontal transport screw conveyer 83 is located inside the contour of the harvesting machine in plan view. The horizontal transport screw conveyer 83 is firmly held and fixed at this home position by a holding apparatus 87 from below.

The bottom part of the grain tank 9 includes a left bottom wall and a right bottom wall that are inclined relative to each other so as to form a wedge shape extending downward, and the bottom part screw 81 is provided at the pointed portion thereof. A left side wall and a right side wall that are connected to the respective upper ends of the left bottom wall and the right bottom wall stand substantially upright. Due to such a configuration of the grain tank 9, grain inputted from the grain tank 9 flows downward toward the bottom part screw 81.

As shown in FIG. 2, a swing pivot shaft part 90 that is tube-shaped is provided on a rear end part of the grain tank 9. The swing axis of the swing pivot shaft part 90 extends coaxial with the vertical axis P2, and the grain tank 9 can swing outward in the horizontal direction about the vertical axis P2, as indicated by dotted lines in FIG. 3. Specifically, the grain tank 9 can be moved between: a work position at which the grain tank 9 can receive grain from the grain elevator apparatus 17b; and a maintenance position at which the grain tank 9 protrudes laterally outward, and the front part thereof is separated from the threshing apparatus 15 so that the space that is behind the manipulation part 14 and on the right of the threshing apparatus 15 is open.

Figure 4:
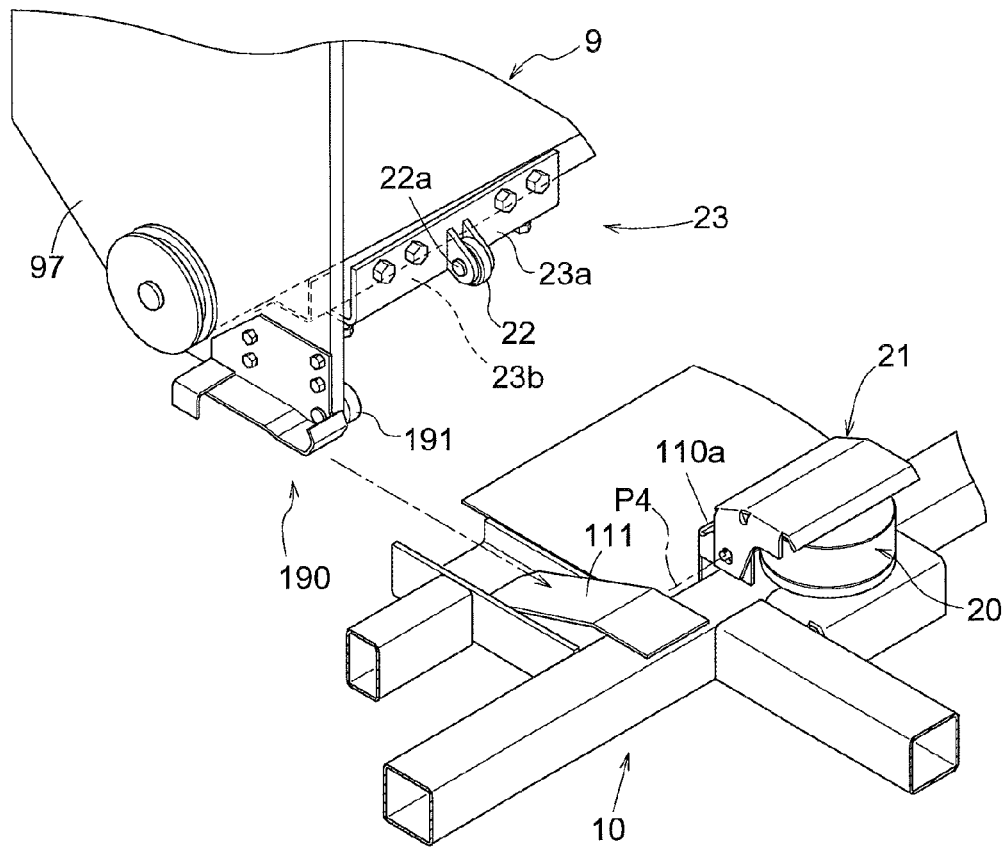
FIG. 4 is a perspective view showing a structure around a load cell that performs grain tank measurement.
Figure 5:
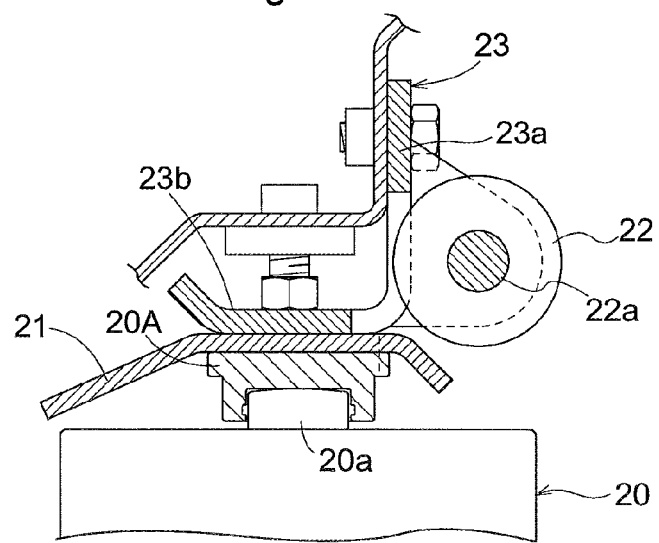
FIG. 5 is a cross-sectional view showing the structure around the load cell that performs grain tank measurement.

As shown in FIG. 2, FIG. 4 and FIG. 5, the combine includes a load cell 20 that constitutes a measuring device 2 that outputs the weight of grain stored in the grain tank 9 as a measurement result. FIG. 4 is a perspective view of an area around the load cell 20 when the grain tank 9 is in the process of transition from the maintenance position to the work position. FIG. 5 is a cross-sectional view of an area around the load cell 20 when the grain tank 9 has returned to the work position. At this position, the load cell 20 receives the weight of the grain tank 9, and outputs the weight as a measurement result. The load cell 20 is attached to the machine body frame 10, and a receiving guide piece 21 that guides a lower part of the grain tank 9 toward a weight detection part 20a of the load cell 20 is provided so as to cover the load cell 20. Along with the grain tank 9 rotating from the maintenance position to the work position, the receiving guide piece 21 guides the grain tank 9 to a position above the weight detection part 20a of the load cell 20 while supporting the lower end of the grain tank 9, and the load cell 20 measure the weight of the grain tank 9 at this position. The receiving guide piece 21 has an inclined surface so as to guide the grain tank 9 while lifting the grain tank 9 along with the grain tank 9 rotating from the maintenance position to the work position. A flat surface further extends from this inclined surface, and a front end part at the front end of the flat surface constitutes an inclined surface that is inclined downward.

The receiving guide piece 21 has a skirt part, and is pivotally supported by a pivot pin so as to be able to swing about a machine body front-rear axis P4 that extends in the front-rear direction of the machine body, relative to a bracket 110a that is fixed to the machine body frame 10. A through hole, that is formed in the bracket 110a in order to allow the pivot pin to pass therethrough, is greater than the pivot pin in terms of size in the top-bottom direction. Consequently, play is formed between the pivot pin and the through hole. Due to such play, the receiving guide piece 21 can be displaced in the top-bottom direction within a predetermined range relative to the machine body front-rear axis P4. Specifically, the receiving guide piece 21 is switchable between a load receiving state in which the receiving guide piece 21 is located at a position where the receiving guide piece 21 covers the weight detection part 20a of the load cell 20 from above and a retracted state in which the receiving guide piece 21 has retracted upward and outward so as to open a space above the load cell 20. Furthermore, with this configuration, when the space above the load cell 20 is open, it is also possible to attach and detach the load cell 20 without attaching or detaching the receiving guide piece 21. Note that, in the present embodiment, as shown in FIG. 5, the weight detection part 20a of the load cell 20 is covered from above by a cap member 20A that is formed in the shape of a cylinder that faces downward. Therefore, when the grain tank 9 is at the work position, the upper surface of the cap member 20A abuts against a lower surface of the receiving guide piece 21, and a lower surface of the cap member 20A abuts against a pressure receiving surface of the weight detection part 20a from above. Specifically, a load on the front side of the grain tank 9 is received by the load cell 20 with the receiving guide piece 21 and the cap member 20A being interposed therebetween.

Next, a configuration that allows the receiving guide piece 21 to receive a load on the front side of the grain tank 9 at the work position will be described. A supporting platform 23 that has an angular shape is attached to a lower part of the grain tank 9, and a roller 22 is rotatably supported on a vertical wall 23a of the supporting platform 23 using a horizontal supporting shaft 22a. The lower end of the roller 22 is located at a position that is lower than a lower surface of a horizontal wall 23b of the supporting platform 23 so that the roller 22 is guided to be abut against the receiving guide piece 21. Therefore, in the state where the roller 22 is guided by the receiving guide piece 21, the horizontal wall 23b of the supporting platform 23 is not in contact with the receiving guide piece 21, and the horizontal wall 23b of the supporting platform 23 is brought into surface contact with the flat surface of the receiving guide piece 21 only when the roller 22 has been removed from the front end part of the receiving guide piece 21. In order to reliably achieve this surface contact, the supporting platform 23 is attached to the grain tank 9 such that the height of the supporting platform 23 is adjustable using an adjustment mechanism. As shown in FIG. 5, the adjustment mechanism can be easily established by e.g. a combination of a fixing bolt that fixes the supporting platform 23 to the grain tank 9 using an elongated hole, and an adjustment bolt whose upper end is pressed against the lower surface of the grain tank 9.

Furthermore, an auxiliary guiding member 190 is provided on a lower part of the grain tank 9 so as to be adjacent to the supporting platform 23. The auxiliary guiding member 190 is a sledge-shaped member that is attached to a front surface of a supporting member 97, and includes an auxiliary roller 191. When the grain tank 9 moves from the maintenance position to the work position, the auxiliary roller 191 rotates along an inclined surface of an inclined platform 111 that is provided on the machine body frame 10. The auxiliary guiding member 190 and the inclined platform 111 are designed so as to have a relative positional relationship in which the auxiliary roller 191 is removed from the inclined platform 111 when the roller 22 has passed the receiving guide piece 21. Specifically, when the grain tank 9 is at the work position, the roller 22 and the auxiliary roller 191 are both suspended in the air, and the weight of the grain tank 9 is measured by the load cell 20 in a stable state where a lower surface of the horizontal wall 23b of the supporting platform 23 and the flat surface of the receiving guide piece 21 are in surface contact.

A measurement result (a measurement value) obtained by the load cell 20 may contain an error if the machine body of the combine is inclined or a large vibration is produced by the machine body. Therefore, a device setting control function for precise measurement is provided in order to correct, as much as possible, negative conditions of the combine that may have an adverse effect on measurement by the load cell 20 so as to allow precise measurement to be performed. Each device is operated through this device setting control function for precise measurement, and the combine is brought into a state that is suitable for the load cell 20 to measure the weight of the grain tank 9. In simplified measurement, the operation of each device using the device setting control function for precise measurement is omitted.

Figure 6:
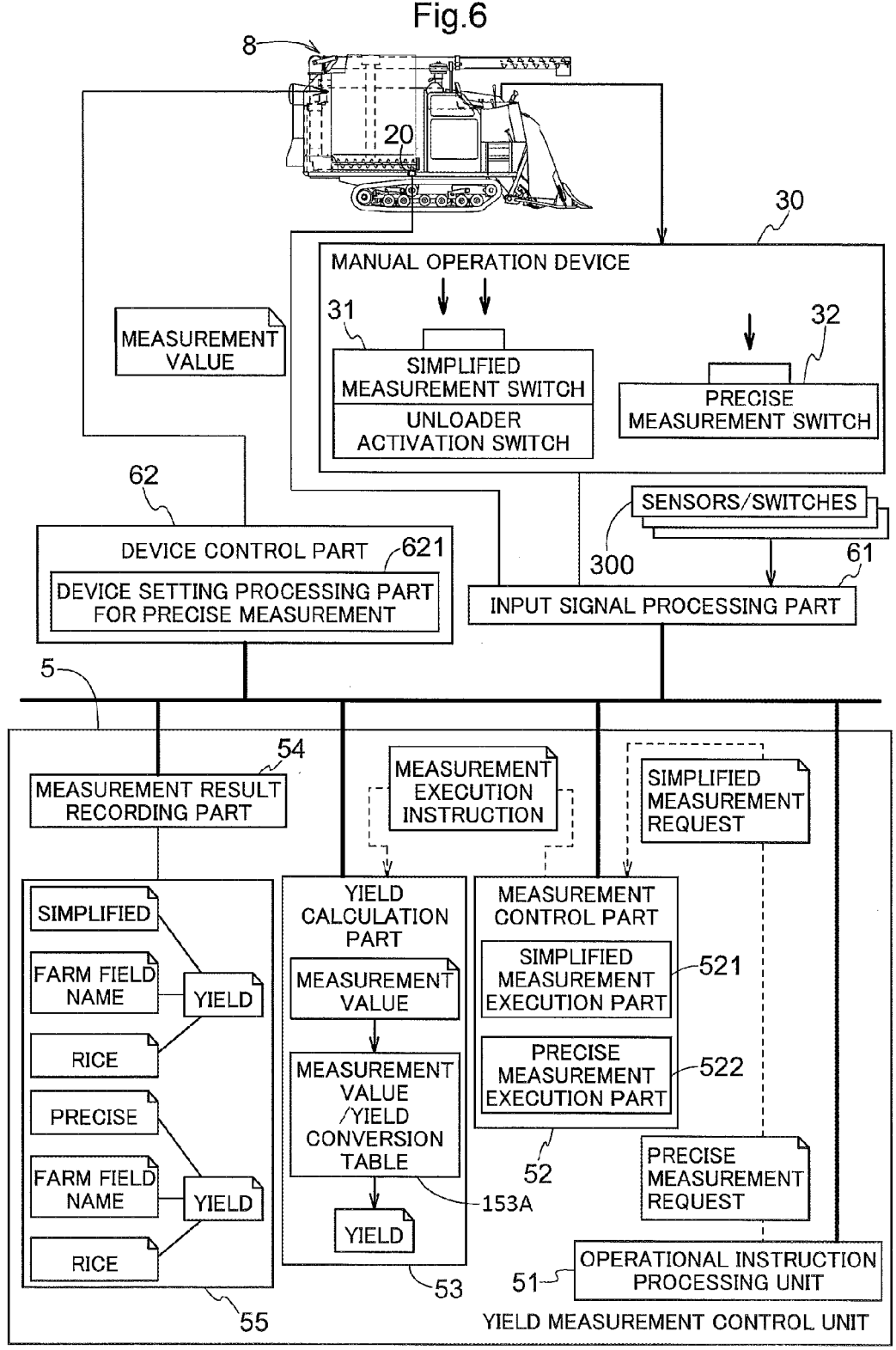
FIG. 6 is a functional block diagram showing functional units included in a measurement control system.

FIG. 6 shows: a yield measurement control unit 5 that is a core element of a control system for measuring the yield (the amount of crop); an input signal processing part 61 that functions as a data input part for the yield measurement control unit 5; and a device control part 62 that controls various operation devices in the combine. The yield measurement control unit 5, the input signal processing part 61, and the device control part 62 are connected to each other via an on-board LAN or other data transmission lines. This control system uses the measurement principal that has been described with reference to FIG. 1.

A measurement value from the load cell 20 and detection signals from sensors/switches 300 are inputted to the input signal processing part 61. Furthermore, a simplified measurement request signal is inputted from the simplified measurement switch 31 included in the manual operation devices 30, and similarly, a precise measurement request signal is inputted from the precise measurement switch 32 included in the manual operation devices 30. These input signals are subjected to necessary pre-processing, and are then transferred to the yield measurement control unit 5.

The sensors/switches 300 include state detectors such as sensors and switches that detect the state of the devices that constitute the combine. The state detectors include, for example: a speed detector that detects that the combine has stopped; a detector that detects that a vehicle body horizontal control mechanism provided for the combine has transitioned to a horizontal orientation that is the home position; a detector that detects the state of a clutch that controls power transmission to the reaping part 12 and the threshing apparatus 15; and a detector that detects the home position of the unloader apparatus 8 (a storage position of the unloader apparatus 8) that is fixed and held by the holding apparatus 87 of the horizontal transport screw conveyer 83.

In the present embodiment, the simplified measurement switch 31 included in the manual operation devices 30 also functions as a switch for activating grain discharge processing that is to be performed by the unloader apparatus 8. Upon the simplified measurement switch 31 being pressed once (a single operation), grain discharge processing by the unloader apparatus 8 is activated. Upon the simplified measurement switch 31 being pressed twice in a row (multiple operations), simplified measurement of the yield is performed first, and then grain discharge processing is performed. When precise measurement of the yield is desired, another switch, namely the precise measurement switch 32, is to be pressed. Also, as described above, even after multiple operations are performed with the simplified measurement switch 31, it is possible to perform precise measurement by operating the precise measurement switch 32, unless grain discharge processing has been started.

The device control part 62 can directly or indirectly provide control signals to various operation devices that are included in the unloader apparatus 8, the reaping part 12, the threshing apparatus 15 and so on. The device control part 62 includes, as a function that particularly relates to the present invention, a device setting processing part 621 for precise measurement that, when the load cell 20 is to perform precise measurement of the weight, provides control signals to the operation devices so that the combine comes into a state that is suitable for precise measurement.

In the yield measurement control unit 5, an operational instruction processing part 51, a measurement control part 52, a yield calculation part 53, and a measurement result recording part 54 are substantially built as software. The operational instruction processing part 51 receives a signal that is outputted according to an operation performed by using the manual operation devices 30, via the input signal processing part 61. For example, upon receiving a signal that requests simplified measurement, the operational instruction processing part 51 outputs a simplified measurement instruction, which instructs to perform simplified measurement, to the measurement control part 52, and upon receiving a signal that requests precise measurement, the operational instruction processing part 51 outputs a precise measurement instruction, which instructs to perform precise measurement, to the measurement control part 52.

The measurement control part 52 includes a simplified measurement execution part 521 that performs simplified weight measurement using the load cell 20, and a precise measurement execution part 522 that performs precise weight measurement using the load cell 20. The simplified measurement execution part 521, upon receiving a simplified measurement instruction from the operational instruction processing part 51, immediately provides a measurement execution instruction to the yield calculation part 53. The precise measurement execution part 522, upon receiving a precise measurement instruction from the operational instruction processing part 51, first instructs the device control part 62 to execute device processing for precise measurement using the device setting processing part 621 for precise measurement. Upon receiving a notification that indicates the completion of device processing for precise measurement from the device control part 62, the precise measurement execution part 522 provides a measurement execution instruction to the yield calculation part 53.

The yield calculation part 53 calculates the yield from a measurement value that is a result of measurement by the load cell 20, using a measurement value/yield conversion table 153A that has been set. The measurement value/yield conversion table 153A differs depending on the type of crop such as rice and wheat, and the specifications of the combine. In the present embodiment, the measurement value/yield conversion table 153A is set based on data that is transmitted from a remote management center at the time of data exchange that is performed when the combine arrives at the farm field that is the target of harvest work, through processing for the confirmation of the farm field performed via a data communication network between the combine and the management center.

The measurement result recording part 54 records the yield calculated by the yield calculation part 53, on a memory 55. If a yield obtained by simplified measurement, previously performed based on a simplified measurement instruction, has been written on the memory; and if a yield is obtained by precise measurement performed based on a precise measurement instruction, then the yield obtained by precise measurement is recorded, with rewriting or overriding the yield obtained by simplified measurement. When a yield is recorded on the memory 55, the type of measurement (precise measurement or simplified measurement) performed to calculate the yield, the name of the farm field, the type of crop and so on are also recorded as attribute values.

Other Embodiments Modified from First Embodiment (1) In the above-described embodiment, one end of the grain tank 9 serves as a pivot and the other end is a floating structure, and the load cell 20 is provided between a lower end part of the floating structure and the machine body frame 10 to perform the measurement of the weight of the grain tank 9. Instead thereof, the grain tank 9 may be supported on the machine body frame 10 at a plurality of supporting points, and the load cell 20 may be located at the supporting points.

(2) Furthermore, as the measuring device 2 for calculating the yield of grain stored in the grain tank 9, a measuring device that directly measures the weight of grain or capacity, instead of measuring the weight including the weight of the grain tank 9, may be employed.

(3) The way to partition the functional parts as shown in FIG. 6 is described only as an example, and instead thereof, the functional parts may be integrated or divided as appropriate. Any configuration may be employed insofar as the control functions of the present invention can be realized, and the functions may be realized as hardware, software or both.

Second Embodiment

Next, a second embodiment will be described.

Before specific description of this embodiment, the flow of information during the zero point adjustment processing performed on a yield measurement part 153 that is mounted on the combine, using the load cell 20, will be described with reference to FIG. 7. This combine includes: a travelling machine body 101; an orientation changing mechanism 200 that changes the orientation/posture of the travelling machine body 101 relative to the ground (the inclination relative to the travelling apparatus (a crawler travelling apparatus 111A in FIG. 7)); a grain tank (one example of a crop tank) 109 that is mounted on the travelling machine body 101 and stores grain that has been transported from a threshing apparatus; and an unloader apparatus 108 that discharges grain stored in the grain tank 109 from a bottom part of the grain tank 109 to the outside. The combine further includes a load cell 20 measuring the weight of the grain tank 109 and the yield measurement part 153 measuring the yield of grain stored in the grain tank 109, based on the result of measurement by the load cell 20. The combine still further includes a zero point adjustment part 155 that performs the zero point adjustment on the yield measurement part 153 including the load cell 20. In order to improve the reliability of the zero point adjustment, when the zero point adjustment by the zero point adjustment part 155 is started, or more accurately, prior to the substantial execution of the zero point adjustment processing, the travelling machine body 101 is orientated to be horizontal relative to the ground surface, using the function of a horizontal orientation control part 152 that controls the orientation changing mechanism 200.

Usually, a manual operation device 130 that is provided in the vicinity of the driver's seat is operated in order to perform the zero point adjustment. The manual operation device 130 can be constituted by a switch, a button, a lever or the like. However, if a display device such as a liquid crystal panel is provided, the manual operation device 130 may be a software button displayed on the display screen of the display device. An operation performed on the software button is inputted via a touch panel. In such a configuration, since the button used to perform the zero point adjustment is not used so frequently, the button may be located at a low level in the button layer. Upon the driver selecting the zero point adjustment by using the manual operation device 130, a zero point adjustment request is outputted and is provided to the zero point adjustment part 155 (#01). Note that, according to the present invention, the zero point adjustment that is performed before factory shipment and the zero point adjustment that is performed by the user or a service person after factory shipment are distinguished from each other, and the former is referred to as the basic zero point adjustment, and the latter is referred to as the temporary zero point adjustment. However, since the two kinds of zero point adjustments per se are processed substantially in a same manner, both will be simply referred to as "the zero point adjustment" when there is no particular need to distinguish one from the other.

Figure 7:
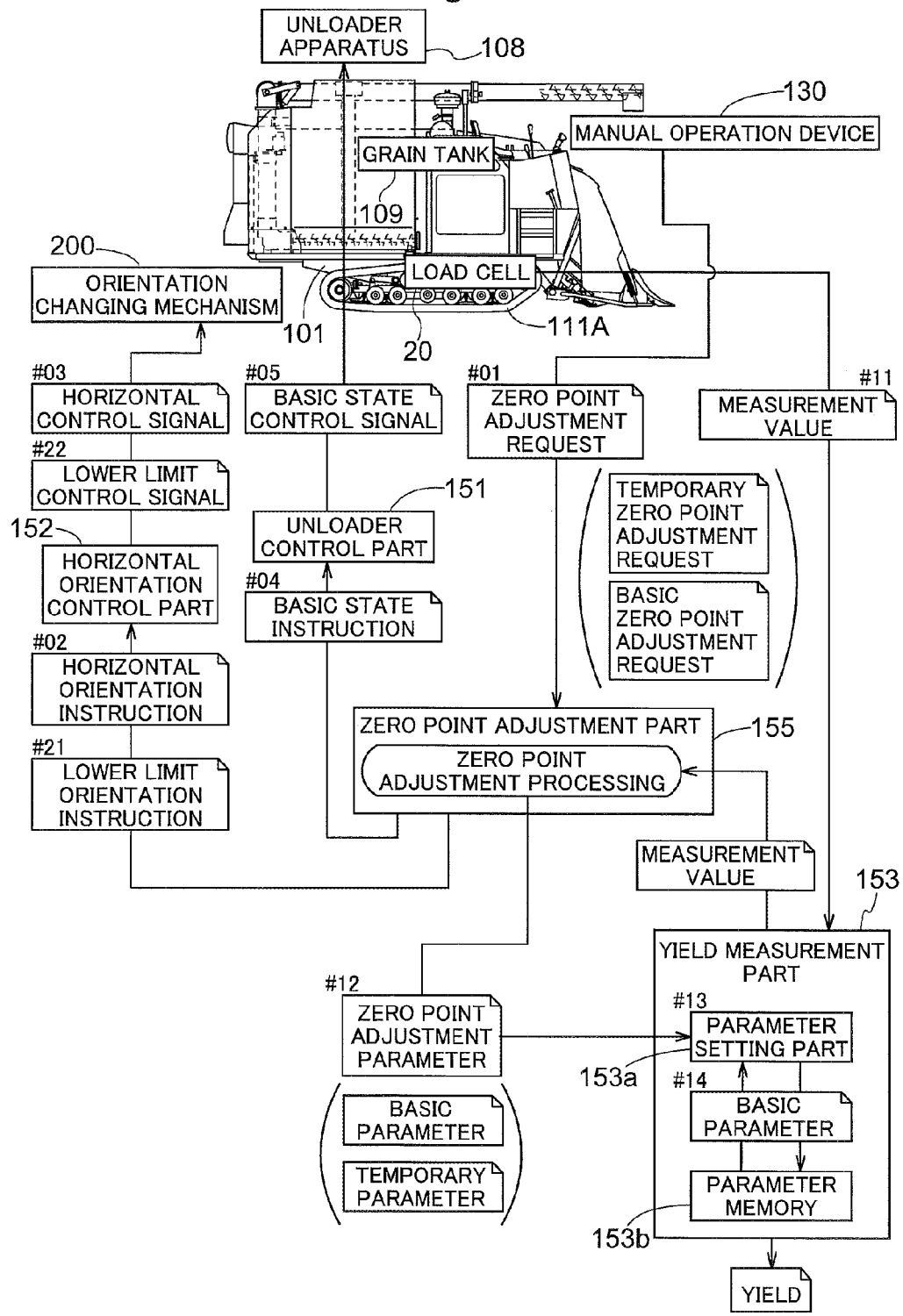
FIG. 7 is a diagram showing a second embodiment of the present invention (the same applies to the following drawings up to FIG. 15), and is a schematic diagram illustrating a basic control flow of a zero point adjustment that is performed for a yield measurement unit that uses a load cell, in a combine that is an example of a harvesting machine.

In the illustrated control as shown in FIG. 7, in order to prevent disturbance during zero point adjustment processing, pre-processing is executed in which the zero point adjustment part 155 causes the horizontal orientation control part 152 to operate the orientation changing mechanism 200 for bring the travelling machine body to a horizontal orientation. In this pre-processing, the zero point adjustment part 155 provides a horizontal orientation instruction to the horizontal orientation control part 152 in response to a zero point adjustment request (#02). In response to this horizontal orientation instruction, the horizontal orientation control part 152 controls the orientation changing mechanism 200 so that the travelling machine body is brought into the horizontal orientation, to thereby establish the horizontal orientation of the travelling machine body 101 (#03).

Furthermore, the zero point adjustment part 155 has an additional function of executing another pre-processing in which, upon receiving the zero point adjustment request, the horizontal transport screw conveyer of the unloader apparatus 108 is reliably fixed at the home position, using a holding apparatus. A typical horizontal transport screw conveyer is the final conveyer for discharging grain, and is swingable in the top-bottom direction; and when there is no need to use the horizontal transport screw conveyer, the horizontal transport screw conveyer is fixed by the holding apparatus at the home position in a substantially horizontal orientation. Preferably, the fixing by the holding apparatus is realized by using a gravity fitting method under a condition where hydraulic pressure has been released. If the gravity fitting method is to be employed, for example, a spindle-shaped protruding part and a recessed part that corresponds to the protruding part are provided for the horizontal transport screw conveyer and the holding apparatus. The horizontal transport screw conveyer is lifted once using an external driving force. After the external driving force is released, with its own weight, the protrusion-shaped part and the recess-shaped part engage with each other. In order to execute a series of these processes, the zero point adjustment part 155 outputs a basic state instruction to the unloader control part 151 (#04). Upon receipt of the basic state instruction, the unloader control part 151 provides a basic state control signal to the unloader apparatus 108 (#05). Even if the horizontal transport screw conveyer has not been appropriately fixed by the holding apparatus before performing the zero point adjustment, the horizontal transport screw conveyer can be reliably fixed by the holding apparatus after these steps.

The zero point adjustment part 155 has a further function of performing post-processing in which, after the completion of zero point adjustment processing, the orientation changing mechanism 200 is controlled so that the travelling machine body 101 is brought into a lower limit orientation in which the height of the travelling machine body 101 relative to the ground is the lowest. In this post-processing, upon the completion of zero point adjustment processing, the zero point adjustment part 155 provides a lower limit orientation instruction to the horizontal orientation control part 152 (#21), and the horizontal orientation control part 152 outputs the lower limit control signal to the orientation changing mechanism 200 (#22) and thus the lower limit orientation of the travelling machine body 101 is realized.

After the completion of pre-processing, zero point adjustment processing is substantially performed. Zero point adjustment processing is well-known processing per se, and the disclosure of Patent Literature 2 can be referenced, for example. To be described briefly, the weight of an empty grain tank 109 in which no grain is stored is measured (#11), and the zero point is calculated based on this measurement value (#12). Here, a parameter that indicates this zero point is referred to as a zero point adjustment parameter. The zero point adjustment parameter thus calculated is taken in by a parameter setting part 153*a* of the yield measurement part 153, and is used as a zero point for yield measurement (#13). Note that the zero point adjustment parameter that is calculated as per the zero point adjustment that is performed before factory shipment and the zero point adjustment parameter that is calculated as per the zero point adjustment that is performed by the user or a service person after factory shipment are distinguished from each other, and the former is referred to as the basic zero point adjustment parameter, and the latter is referred to as the temporary zero point adjustment parameter. However, they are simply referred to as "the zero point adjustment parameter" when there is no particular need to distinguish them from each other. The basic zero point adjustment parameter is recorded on a parameter memory 153*b* before being replaced with the temporary zero point adjustment parameter, and if the temporary zero point adjustment parameter is reset, the basic zero point adjustment parameter will be set again (#14).

Figure 8:
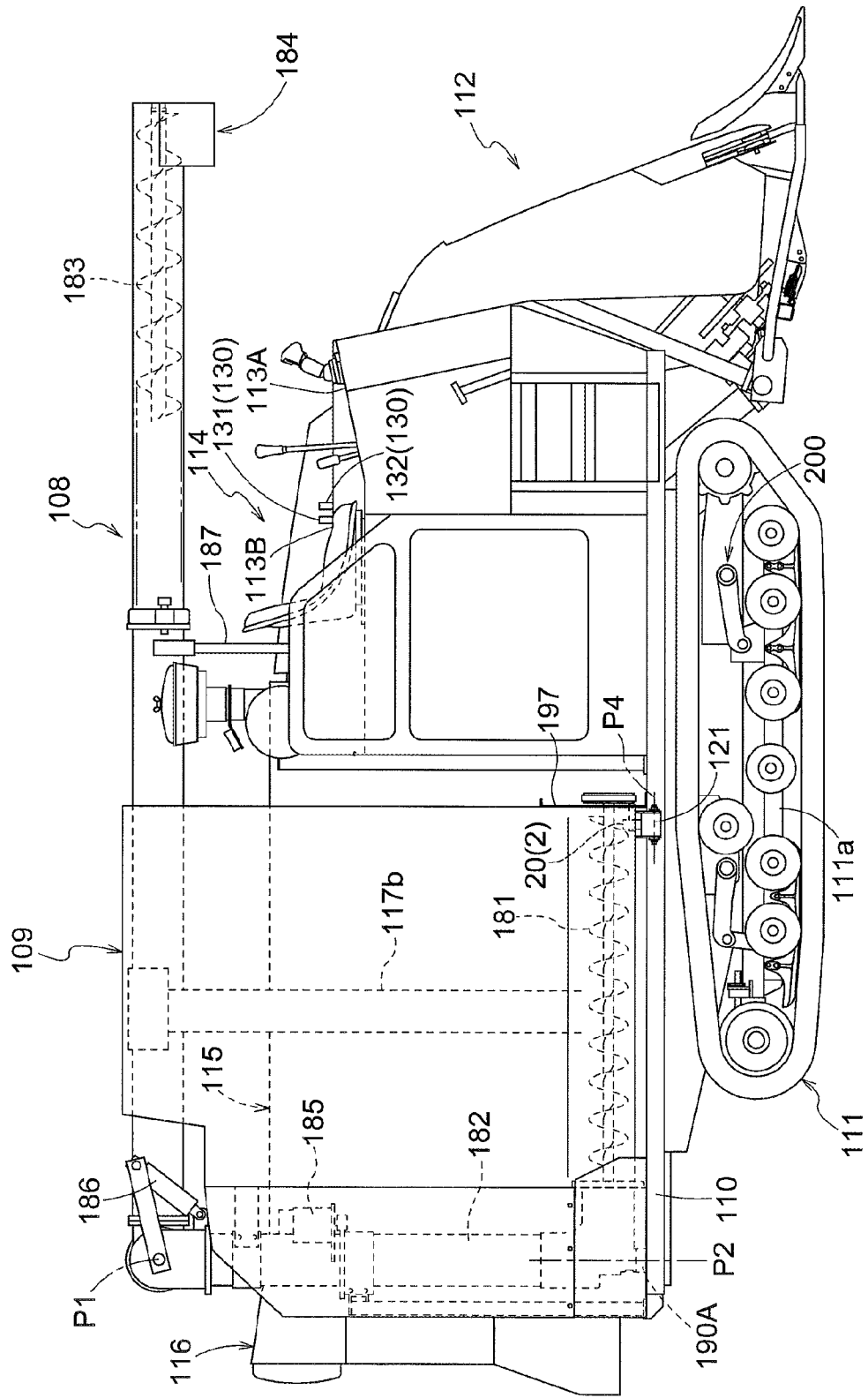
FIG. 8 is a side view of the combine.
Figure 9:
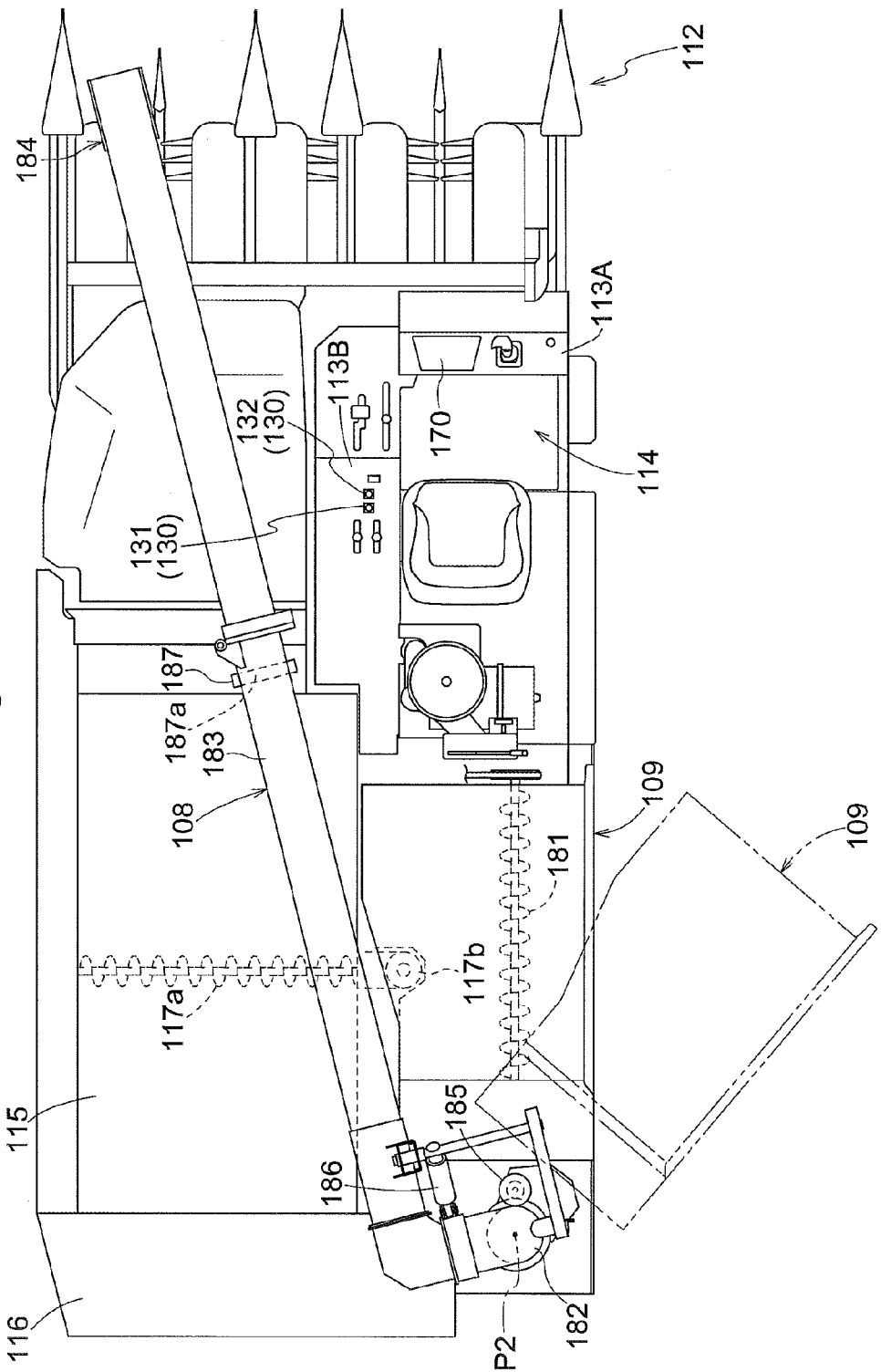
FIG. 9 is a plan view of the combine.

Next, one specific embodiment of the combine will be described with reference to the drawings, in which FIG. 8 is a side view of the combine and FIG. 9 is a plan view of the same. This combine is a head-feeding type combine, and a machine body frame 110 that constitutes the travelling machine body 101 is supported over the ground by a pair of right and left crawler travelling apparatuses 111A. A reaping part 112 that reaps planted stalks and transports the reaped stalks rearward of the machine body is provided on a front part of the machine body, and a manipulation part 114 that includes a front console 113A and a side console 113B is provided rearward of the reaping part 112. Furthermore, a threshing apparatus 115 that performs the threshing/separation of the reaped stalks, a grain tank (one example of a crop tank) 109 that stores grain that has been subjected to separation and collection by the threshing apparatus 115, an unloader apparatus 108 that discharges grain from the grain tank 109, a waste straw processing apparatus 116 that processes waste straw, and so on are arranged. As shown in FIG. 9, the front console 113A includes a manipulation lever, a transmission lever, and a liquid crystal panel 170 that serves as a display device for displaying various kinds of information. The side console 113B includes a manual operation device 130 used for performing the zero point adjustment.

The threshing apparatus 115 performs threshing processing on the ear tip side of the reaped stalks that have been transported from the reaping part 112, performs separation between: individual grains that have been separated from each other; and dust such as straw dust, through the separating action of a separation mechanism (not shown) that is provided in the threshing apparatus 115, and transports the individual grains to the grain tank 109 as the crop. Waste straw that has undergone threshing processing is subjected to shredding processing in the waste straw processing apparatus 116.

As can be understood from FIGS. 8 and 9, a grain transport mechanism for feeding grain from the threshing apparatus 115 to the grain tank 109 is provided. This grain transport apparatus is constituted by: a first-crop collection screw 117*a* that is provided on a bottom part of the threshing apparatus 115; and a grain elevator apparatus 117*b* that is of a screw conveyer type. The grain that has been laterally transported by the first-crop collection screw 117*a* is transported upward by the grain elevator apparatus 117*b*, and is fed to the inside of the grain tank 109 via an input port that is formed in an upper part of the grain tank 109. Although not shown in the drawings, a rotary vane that flips the grain toward the inside of the grain tank 109 is provided in an upper end area of the grain elevator apparatus 117b so that grains are distributed as uniformly as possible in the horizontal direction in the grain tank 109.

Figure 10:
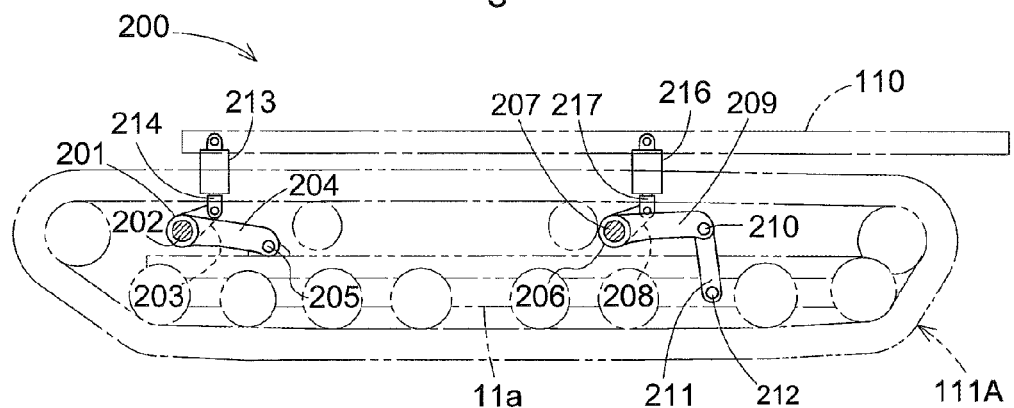
FIG. 10 is a side view schematically showing a configuration of an orientation changing mechanism.
Figure 11:
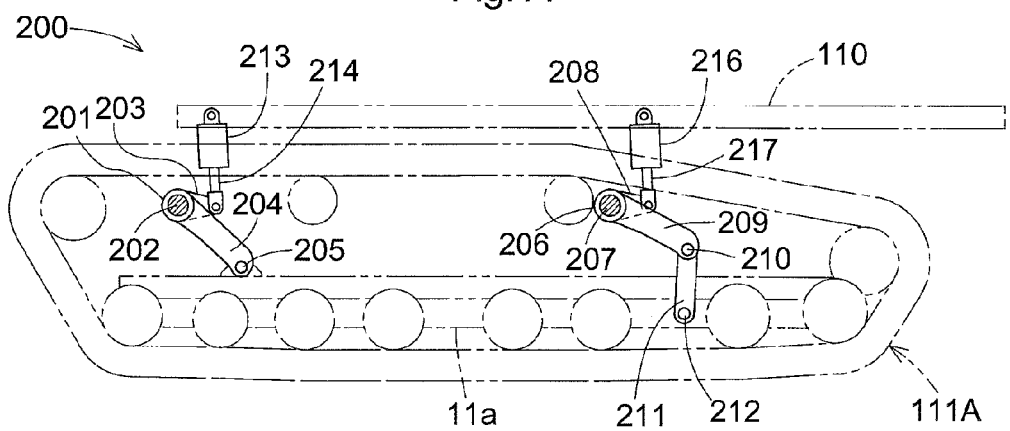
FIG. 11 is a side view showing the orientation changing mechanism in a rolling state.
Figure 12:
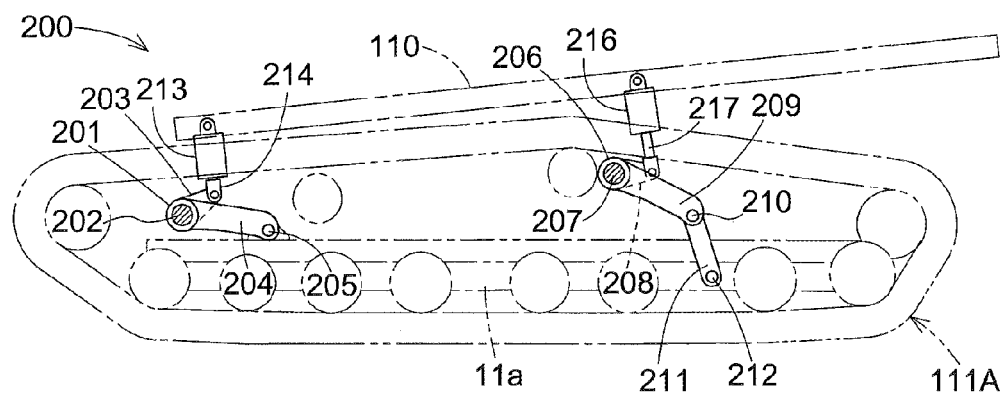
FIG. 12 is a side view showing the orientation changing mechanism in a pitching state.

As schematically shown in FIGS. 10, 11 and 12, the orientation changing mechanism 200 is provided between the machine body frame 110 and the truck frames 111a of the crawler travelling apparatus 111A, to perform a rolling function for bringing the machine body frame 110 into a horizontal orientation relative to the right-left inclination of the machine body by moving either one of the right and left truck frames 111a upward or downward; and a pitching function for bringing the machine body frame 110 into a horizontal orientation relative to the front-rear inclination of the machine body by moving either one of a front part and a rear part of the truck frames 111a.

A supporting metal 201 is provided below a front part of the machine body frame 110, and the supporting metal 201 includes a shaft part 202 that extends in the right-left direction of the machine body and is rotatable. A base part of a forward operation arm 203 is fixed to an inner end part of the shaft part 202, and the end part that is opposite the base part of the front operation arm 203 is located on the side of a rear part of the machine body. A base part of a forward elevation arm 204 is fixed to an outer end part of the shaft part 202, and the other end part of the front elevation arm 204 is fixed to the truck frames 111a with a shaft 205 being interposed therebetween.

A supporting metal 206 is provided below a rear part of the machine body frame 110, and the supporting metal 206 includes a shaft part 207 that extends in the right-left direction of the machine body and is rotatable. A base part of a rear operation arm 208 is fixed to an inner end part of the shaft part 207, and the end part that is opposite the base part of the rear operation arm 208 is located on the side of a rear part of the machine body. One end of a rear elevation first arm 209 is fixed to an outer end part of the shaft part 207, and the other end part of the rear elevation first arm 209 is attached to a shaft 210. A base part of a rear elevation second arm 211 is attached to the shaft 210 so as to be swingable, and the other end of the rear elevation second arm 211 is fixed to the truck frames 111a with a shaft 212 being interposed therebetween.

A piston rod 214 of a single action type hydraulic cylinder 213 for rolling is attached to an end part of the forward operation arm 203, using a shaft. The hydraulic cylinder 213 is provided to span the forward operation arm 203 and the machine body frame 110 in the vertical direction. Also, a piston rod 217 of a single action type hydraulic cylinder 216 for rolling and pitching is attached to an end part of the rear operation arm 208, using a shaft. The hydraulic cylinder 216 is provided to span the rear operation arm 208 and the machine body frame 110 in the vertical direction.

Two hydraulic cylinders 213 are respectively provided on front parts of the right and left truck frames 111a, and two hydraulic cylinders 216 are respectively provided on rear parts of the right and left truck frames 111a. It is possible to allow the machine body to perform a pitching operation and a rolling operation by causing each of the hydraulic cylinders 213, 216 to operate individually and controlling the amount of operation of each of the hydraulic cylinders 213, 216. The hydraulic cylinders 213 for rolling and the hydraulic cylinders 216 for rolling and pitching have the same cross-sectional area. When the machine body is to perform a rolling operation, the right or left hydraulic cylinders 213, 216 are expanded or contracted by the same amount, and when the machine body is to perform a pitching operation, only the right and left hydraulic cylinders 216 are expanded or contracted.

As shown in FIG. 10, the front operation arm 203 and the front elevation arm 204 are both provided so as to extend rearward of the machine body relative to the shaft part 202, and the length of the front operation arm 203 in the direction from the shaft part 202 to the rear side of the machine body is set so as to be the same as or shorter than the length of the front elevation arm 204 in the direction from the shaft part 202 to the rear side of the machine body. The hydraulic cylinder 213 extends in the vertical direction, with the piston rod 214 provided at a lower portion thereof so as to protrude and retract relative to the forward operation arm 203.

Also, the rear operation arm 208, the rear elevation first arm 209 and the rear elevation second arm 211 are all provided so as to extend rearward of the machine body relative to the shaft part 207, and the length of the rear operation arm 208 in the direction from the shaft part 207 to the rear side of the machine body is set so as to be the same as or shorter than the length of the rear elevation first arm 209 and the rear elevation second arm 211 in the direction from the shaft part 207 to the rear side of the machine body. The hydraulic cylinder 216 extends in the vertical direction, with the piston rod 217 provided at a lower portion thereof so as to protrude and retract relative to the rear operation arm 208.

By controlling the hydraulic cylinders 213, 216 of the above-described orientation changing mechanism 200, it is possible to create the horizontal orientation of the travelling machine body 101 regardless condition of the ground surface, and it is also possible to create the lower limit orientation of the travelling machine body 101 that is a horizontal orientation in which the height from the ground of the travelling machine body 101 is the lowest.

As shown in FIGS. 8 and 9, the unloader apparatus 108 includes: a bottom part screw 181 that is provided on the bottom part of the grain tank 109; a vertical transport screw conveyer 182 that is provided on a side of the grain tank 109 that is rearward of the machine body; and a horizontal transport screw conveyer 183 that extends over the threshing apparatus 115. Grain stored in the grain tank 109 is fed from the bottom part screw 181 to the horizontal transport screw conveyer 183 via the vertical transport screw conveyer 182, and is discharged to the outside from a discharge port 184 that is provided at the front end of the horizontal transport screw conveyer 183. The vertical transport screw conveyer 182 is configured to rotate about the vertical axis P2 using the operation of an electrical motor 185, and the horizontal transport screw conveyer 183 is configured to be swingable in the top-bottom direction about the horizontal axis P1 at a base end part using a hydraulic cylinder 186. With this configuration, it is possible to position the discharge port 184 of the horizontal transport screw conveyer 183 so that grain can be discharged to a transportation truck or the like outside the machine. The home position of the horizontal transport screw conveyer 183 (the home position of the unloader apparatus 108) is a position at which the horizontal transport screw conveyer 183 is substantially horizontal and the entirety of the horizontal transport screw conveyer 183 is located inside the contour of the harvesting machine in plan view. The horizontal transport screw conveyer 183 is firmly held and fixed at this home position by a holding apparatus 187 from below.

The holding apparatus 187 has an arch-shaped receiving surface 187a (see FIG. 9) that is open upward. The shape of this receiving surface 187a corresponds to the shape of the lower surface of the horizontal transport screw conveyer 183 at the corresponding position. When the horizontal transport screw conveyer 183 is at the home position at which the horizontal transport screw conveyer 183 is substantially horizontal, the receiving surface 187a can receive and fix the lower surface of the horizontal transport screw conveyer 183. In this respect, there are cases in which the horizontal transport screw conveyer 183 is in a floating state where the horizontal transport screw conveyer 183 is slightly floating above the receiving surface 187a for some reason (e.g. remaining hydraulic pressure in the hydraulic cylinder 186). When the horizontal transport screw conveyer 183 is in such a floating state, it is possible to reliably fix the horizontal transport screw conveyer 183 by operating the hydraulic cylinder 186 to slightly lift the horizontal transport screw conveyer 183, and then reducing the hydraulic pressure of the hydraulic cylinder 186 so that the horizontal transport screw conveyer 183 fits into the receiving surface 187a under its own weight.

The bottom part of the grain tank 109 includes a left bottom wall and a right bottom wall that are inclined relative to each other so as to form a wedge shape extending downward, and the bottom part screw 181 is provided at the pointed portion thereof. A left side wall and a right side wall that are connected to the respective upper ends of the left bottom wall and the right bottom wall stand substantially upright. Due to such a configuration of the grain tank 109, grain inputted from the grain tank 109 flows downward toward the bottom part screw 181.

As shown in FIG. 8, a swing pivot shaft part 190A that is tube-shaped is provided on a rear end part of the grain tank 109. The swing axis of the swing pivot shaft part 190A extends coaxial with the vertical axis P2, and the grain tank 109 can swing outward in the horizontal direction about the vertical axis P2, as indicated by dotted lines in FIG. 9. Specifically, the grain tank 109 can be moved between: a work position at which the grain tank 109 can receive grain from the grain elevator apparatus 117b; and a maintenance position at which the grain tank 109 protrudes laterally outward, and the front part thereof is separated from the threshing apparatus 115 so that the space that is behind the manipulation part 114 and on the right of the threshing apparatus 115 is open.

The detailed structure of the load cell 20 and the structure for guiding the grain tank 109 to the load cell 20 and measuring the weight of the grain tank 109 are the same as those that have been described in the first embodiment with reference to FIGS. 4 and 5. Therefore, the descriptions thereof are omitted here.

Figure 13:
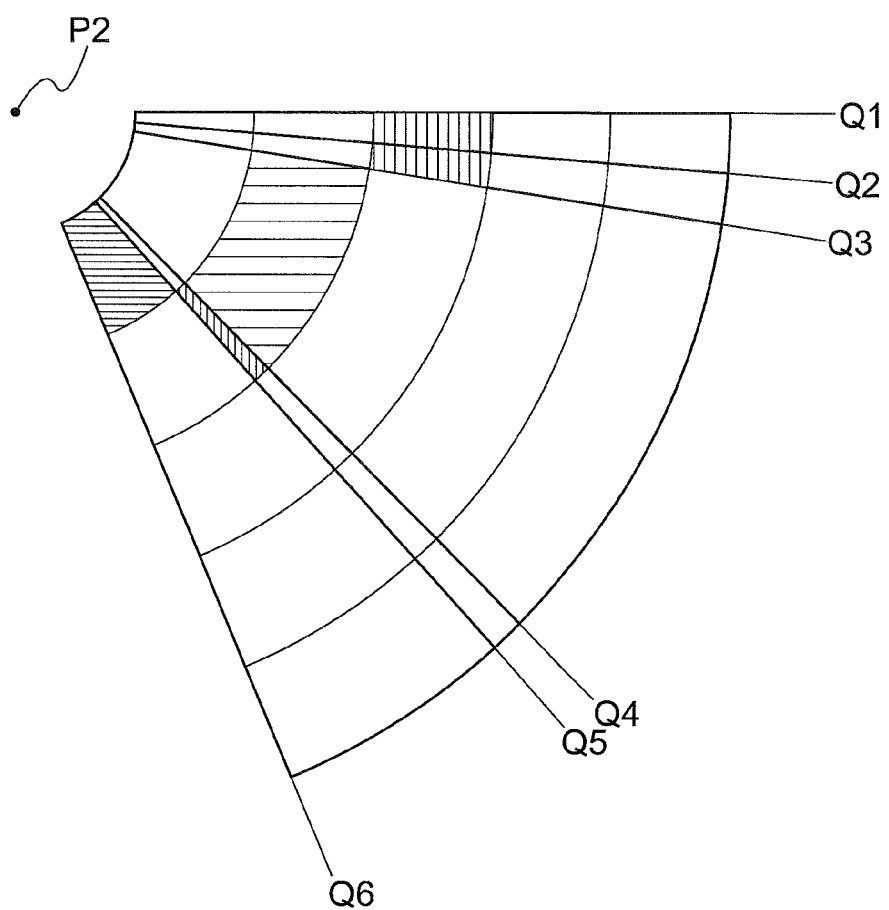
FIG. 13 is a diagram illustrating how a load of a grain tank is received during horizontal swinging of the grain tank about a vertical axis.

FIG. 13 schematically shows how a load of the grain tank 109 is received during the horizontal swinging of the grain tank 109 about the vertical axis P2. At a first swing point Q1, which is the above-described work position (the measurement position for the load cell 20), the load of the grain tank 109 is received by the load cell 20. Within a swing range from the first swing point Q1 to a second swing point Q2, the load of the grain tank 109 is received by the roller 22 and the auxiliary roller 191. Within a swing range from the second swing point Q2 to a third swing point Q3, the load of the grain tank 109 is received by the auxiliary roller 191.

Also, as schematically shown in FIG. 14, a rear stay 141 that, when the grain tank 109 swings in the horizontal direction, slides along an upper surface of a slide platform 140 that is provided on the machine body frame 110, is provided on the bottom part of the grain tank 109 in the vicinity of the vertical axis P2. Also, a lock hole 142 is formed in the slide platform 140, and a lock pin 143 that is configured to slide in the top-bottom direction and is biased downward by a lock spring 144 is provided on the bottom part of the grain tank 109. The positional relationship between the rear stay 141, the lock hole 142 and the lock pin 143 will be described with reference to FIGS. 13 and 14. With reference to (a) in FIG. 14, during the outward horizontal swinging of the grain tank 109 about the vertical axis P2 from the third swing point Q3 to the fourth swing point Q4, the rear stay 141 and the lock pin 143 slides along the upper surface of the slide platform 140, and a rear part of the grain tank 109 (in the vicinity of the vertical axis P2) is supported by the rear stay 141. With reference to (b) in FIG. 14 next, when the grain tank 109 reaches the fifth swing point Q5, the lock pin 143 enters the lock hole 142. Consequently, the horizontal swing of the grain tank 109 about the vertical axis P2 is locked. In order to move the grain tank 109, it is necessary to lift the lock pin 143 from the lock hole 142 opposing the biasing force of the lock spring 144, and swing the grain tank 109 to a position where the lock pin 143 and the lock hole 142 are out of phase. Note that as a result of the lock pin 143 being lifted from the lock hole 142, the grain tank 109 is further supported by the rear stay 141 for a short distance from the fourth swing point Q4 to the fifth swing point Q5. From the fifth swing point Q5 to the sixth swing point Q6 that is the limit of swing, the grain tank 109 is supported only by a bearing part that constitutes the vertical axis P2.

Figure 15:
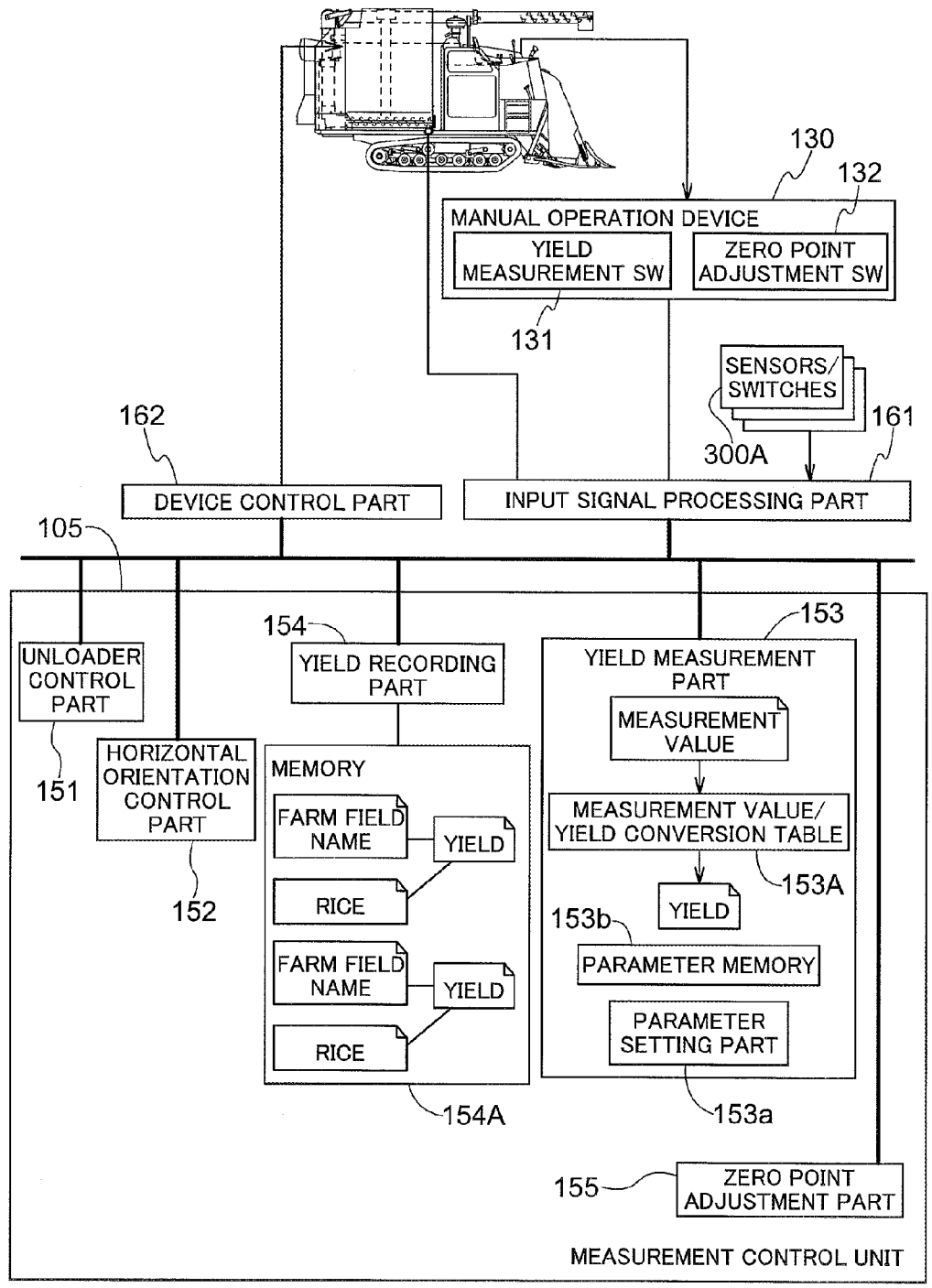
FIG. 15 is a functional block diagram showing functional units included in a measurement control system.

FIG. 15 is a functional block diagram that shows functional elements in the control system that relate to the yield measurement and the zero point adjustment. This control system includes a measurement control unit 105, an input signal processing part 161 that functions as a data input part of the measurement control unit 105, and a device control part 162 that controls various operation devices in the combine. The measurement control unit 105, the input signal processing part 161, and the device control part 162 are connected to each other via an on-board LAN or other data transmission lines. The measurement control unit 105 operates based on the basic principle of zero point adjustment processing that has been described with reference to FIG. 7.

A measurement value from the load cell 20 and detection signals from sensors/switches 300A are inputted to the input signal processing part 161. The manual operation device 130 includes a yield measurement switch 131 and a zero point adjustment switch 132. A yield measurement request signal is inputted to the input signal processing part 161 upon the yield measurement switch 131 being operated, and a zero point adjustment request signal is inputted to the input signal processing part 161 upon the zero point adjustment switch 132 being operated. These input signals are subjected to necessary pre-processing, and are then transferred to the measurement control unit 105.

The sensors/switches 300A include state detectors such as sensors and switches that detect the state of the devices that constitute the combine. The state detectors include, for example: a speed detector that detects that the combine has stopped; a detector that detects that a machine body horizontal control mechanism provided for the combine has transitioned to a horizontal orientation that is the home position; a detector that detects the state of a clutch that controls power transmission to the reaping part 112 and the threshing apparatus 115; and a detector that detects the home position of the unloader apparatus 108 (a storage position of the unloader apparatus 108) that is fixed and held by the holding apparatus 187 of the horizontal transport screw conveyer 183.

The measurement control unit 105 includes the unloader control part 151, the horizontal orientation control part 152, the yield measurement part 153, a yield recording part 154, and the zero point adjustment part 155. The functions of the unloader control part 151 and the horizontal orientation control part 152 are the same as those that have been described with reference to FIG. 7. In the control system of this combine, an unloader control unit that operates the unloader apparatus 108 independently of the yield measurement and the zero point adjustment is built, and, in reality, the unloader control part 151 simply provides a desired instruction to the unloader control unit. However, the unloader control unit is omitted here in order to simplify the description. Similarly, an orientation change control unit that controls orientation changing mechanism 200 is also built, and, in reality, the horizontal orientation control part 152 simply provides an instruction to take on the horizontal orientation or the lower limit orientation to the orientation change control unit. However, the orientation change control unit is omitted here in order to simplify the description.

The yield measurement part 153 calculates the yield from a measurement value that is a result of measurement by the load cell 20, using a measurement value/yield conversion table 153A that has been set. The measurement value/yield conversion table 153A differs depending on the type of crop such as rice and wheat, and the specifications of the combine. In the present embodiment, the measurement value/yield conversion table 153A is set based on data that is transmitted from a remote management center at the time of data exchange that is performed when the combine arrives at the farm field that is the target of harvest work, through processing for the confirmation of the farm field performed via a data communication network between the combine and the management center.

The yield recording part 154 records the yield calculated by the yield measurement part 153, on a memory 154A. At this time, the name of the farm field, the type of crop, etc. are also recorded as attribute values of the yield.

The main functions of the zero point adjustment part 155 are the same as those that have been described with reference to FIG. 7. In response to a zero point adjustment request signal that is outputted upon the zero point adjustment switch 132 being operated, zero point adjustment processing is executed in conjunction with the unloader control part 151, the horizontal orientation control part 152, and the yield measurement part 153, and a zero point adjustment parameter thus obtained is set by the parameter setting part 153a of the yield measurement part 153. In this embodiment as well, the zero point adjustment parameter that is calculated by using a zero point adjustment that is performed before factory shipment (the basic zero point adjustment parameter) and the zero point adjustment parameter that is calculated by using a zero point adjustment that is performed by the user or a service person after factory shipment (the temporary zero point adjustment parameter) are distinguished from each other. The basic zero point adjustment parameter is recorded on the parameter memory 153b before being replaced with the temporary zero point adjustment parameter, and if the temporary zero point adjustment parameter is reset, the basic zero point adjustment parameter will be set again.

Other Embodiments Modified from Second Embodiment (1) In the above-described embodiment, one end of the grain tank 109 serves as a pivot and the other end is a floating structure, and the load cell 20 is provided between a lower end part of the floating structure and the machine body frame 110 to perform the measurement of the weight of the grain tank 109. Instead thereof, the grain tank 109 may be supported on the machine body frame 110 at a plurality of supporting points, and the load cell 20 may be located at the supporting points.

(2) The ways to partition the functional parts as shown in FIGS. 7 and 15 are described each as an example only, and instead thereof, the functional parts may be integrated or divided as appropriate. Any configuration may be employed insofar as the control functions of the present invention can be realized, and the functions may be realized as hardware, software or both.

Third Embodiment

Next, a third embodiment will be described.

Figure 16:
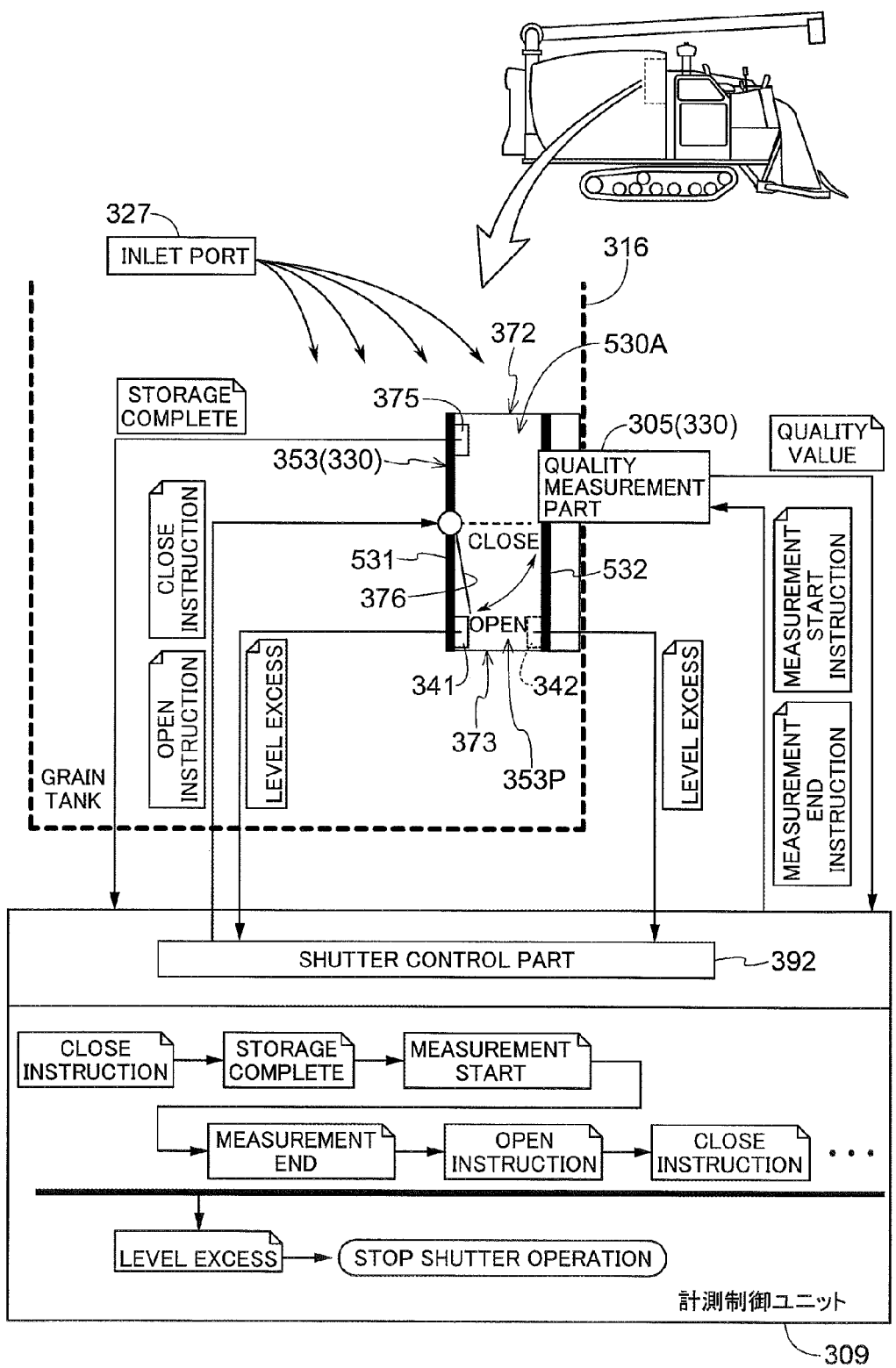
FIG. 16 is a diagram showing a third embodiment of the present invention (the same applies to the following drawings up to FIG. 25), and is a schematic diagram showing a basic configuration for performing grain quality measurement that is mounted on a combine (a crawler travelling head-feeding type combine) that is an example of a harvesting machine.

Before specific description of this embodiment, a basic configuration for grain quality measurement that is performed by this combine will be described. FIG. 16 schematically shows a grain quality measurement mechanism that is provided on a wall member of a grain tank 316. A measurement unit 330 includes a tube-shaped member 353 and a quality measurement part 305. An inlet port 327 from which grain that has been transported from a threshing apparatus is discharged is formed in an upper part of the grain tank 316. The tube-shaped member 353 has a first wall 531 that faces a center part and a second wall 532 that faces the wall member of the grain tank 316, and a grain path 353P that extends in the vertical direction is formed inside the tube-shaped member 353. An upper opening of the grain path 353P serves as an inlet port 372 from which some of the grain that has been discharged from the inlet port 327, and a lower opening of the grain path 353P serves as a discharge port 373 from which the grain that has been taken in from the inlet port 372 is discharged to the grain tank 316. A temporary storage part 530A that temporarily stores the grain that has been taken in is formed halfway of the grain path 353P. The temporary storage part 530A includes a storage shutter 376 that can be moved between: a closed position for storing, at which the storage shutter 376 takes on a horizontal orientation in order to store grain that has been taken in from the inlet port 372 of the temporary storage part 530A; and an open position for discharging, at which the storage shutter 376 takes on a downward orientation in order to discharge the stored grain from the temporary storage part 530A.

Grain is stored in the temporary storage part 530A upon the storage shutter 376 being switched to the closed position for storing, in response to a close instruction from a shutter control part 392 that is built in a measurement control unit 309. Upon the amount of stored grain reaching an appropriate amount for quality measurement, a storage amount detector 375 outputs a storage complete signal to the measurement control unit 309. In response to the storage complete signal, a measurement start instruction is transmitted to the quality measurement part 305. The quality measurement part 305 outputs a quality value to the measurement control unit 309 as a measurement result. Subsequently, the measurement control unit 309 transmits a measurement end instruction to the quality measurement part 305, and the shutter control part 392 transmits an open instruction to the storage shutter 376. As a result, the storage shutter 376 is switched to the open position for discharging, and the grain stored in the temporary storage part 530A is discharged. Such a series of quality measuring processing is repeated during reaping and threshing processing.

As the amount of grain in the grain tank 316 increases, the upper surface level of the grain approaches the discharge port 373, and then grain enters the grain path 353P. When the storage shutter 376 is at the open position for discharging at which the storage shutter 376 is in the downward orientation, if the lower end of the storage shutter 376 thrusts into the grain that has been gradually stored in the grain tank 316, a load is applied to the storage shutter 376, and the storage shutter 376 stops. A grain level detector 341 is provided in order to stop reaping and threshing processing or grain quality measurement processing or both before such a situation occurs. The grain level detector 341 is configured to detect that the distance between the lower end of the storage shutter 376 in the downward orientation and the upper surface level of the grain (here, this distance is defined as "the below-shutter distance") has reached a predetermined value. Therefore, upon detecting that the below-shutter distance has exceeded the predetermined value, the grain level detector 341 transmits a level excess signal to the shutter control part 392 as a detection signal. In response to the level excess signal, the shutter control part 392 stops the position changing operation of the storage shutter 376, and the measurement control unit 309 cancels grain quality measurement processing.

In the example shown in FIG. 16, a second grain level detector 342, which is optional, is indicated by dotted lines. In this example, the above-described first grain level detector 341 is provided on the first wall 531, and the second grain level detector 342 is provided on the second wall 532. Due to the presence of the two grain level detectors 341, 342, not only the reliability of detection is improved, but also such presence allows for estimation of e.g. a degree of inclination of the upper surface level of the grain that has entered the grain path 353P.

If a failure occurs in the storage amount detector 375 that detects that the amount of grain stored in the temporary storage part 530A has reached an appropriate amount for quality measurement, the storage amount detector 375 cannot send out the storage complete signal, or otherwise the storage amount detector 375 sends out the storage complete signal repeatedly. Consequently, it becomes impossible to perform grain quality measurement processing. Thus, the storage amount detector 375 is an important detector for grain quality measurement processing. A basic principal of the detection of a failure in the storage amount detector 375 will be described with reference to FIG. 17.

Figure 17:
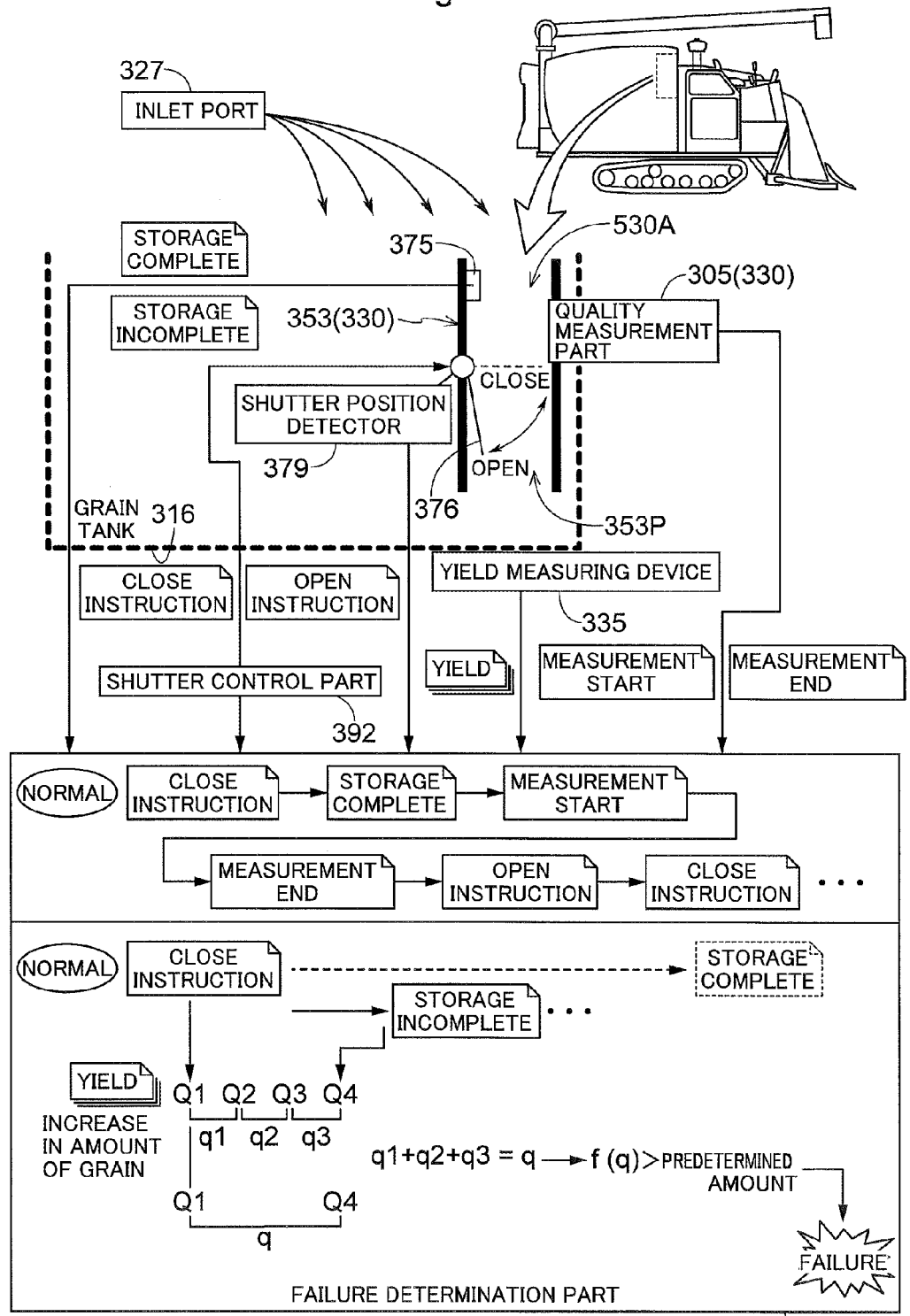
FIG. 17 is a schematic diagram showing a basic principle of control for detecting a failure in a storage amount detector that is used for grain quality measurement.

Although simply illustrated in FIG. 17, the configurations of the tube-shaped member 353 and the storage shutter 376 that form the grain path 353P and the temporary storage part 530A are substantially the same as those shown in FIG. 16. The grain level detector 341 is omitted, but a shutter position detector 379 that detects a positional change of the storage shutter 376 is shown in FIG. 17 instead. Also, a yield measuring device 335 that measures the yield of grain stored in the grain tank 316 is shown in FIG. 17. A failure determination part 394 that is a core element for detecting a failure in the storage amount detector 375 is built in the measurement control unit 309. The failure determination part 394 determines that a failure has occurred in the storage amount detector 375, based on the fact that the storage amount detector 375 has not outputted a storage complete signal, despite the amount of grain stored in the temporary storage part 530A, which is estimated based on the result of measurement by the yield measuring device 335, has exceeded the predetermined amount.

An example of failure determination performed by the failure determination part 394 is to determine a failure in the storage amount detector 375 based on the result of measurement by the yield measuring device 335 over time and the result of detection by the shutter position detector 379. As described with reference to FIG. 16, and as schematically shown in FIG. 17, in grain quality measurement processing, a series of control in which the following operations are sequentially repeated is executed: a close instruction is outputted from the shutter control part 392 to the storage shutter 376; a storage complete signal is outputted from the storage amount detector 375; the measurement starts; the measurement ends; and an open instruction is outputted from the shutter control part 392 to the storage shutter 376. During this grain quality measurement processing, the yield, which is the result of measurement by the yield measuring device 335, is continuously taken in by the failure determination part 394. In FIG. 17, yields obtained over time from a given point in time when a close instruction is outputted to the storage shutter 376 are indicated as Q1, Q2, Q3, Q4 and so on. An increase q in the amount of grain from when the close instruction is outputted, to a specific point in time, can be obtained by calculating the integration of q1, q2, q3 and so on that each indicate an increase in the amount of grain in the grain tank 316 at the time when the corresponding yield is calculated. Alternatively, the increase q can be calculated from the difference between the yield at a specific point in time and the yield at the point in time when the close instruction is outputted. The proportion of the amount of grain that passes through the grain path 353P to the amount of grain that is discharged from the inlet port 327 is estimated in advance. Therefore, the relationship between the increase q and the amount stored in the temporary storage part 530A can be expressed as a function or a table using a function f. Therefore, if a storage complete signal is not outputted despite the increase in the amount of grain in the grain tank 316, from when the storage shutter 376 is closed, being far beyond the value corresponding to the predetermined amount at which the storage amount detector 375 should output the storage complete signal, it can be determined that a failure has occurred in the storage amount detector 375.

Also, if the storage amount detector 375 still outputs a storage complete signal despite the storage shutter 376 having been switched from the close position for storing to the open position for discharging and grain having been discharged from the temporary storage part 530A, the failure determination part 394 can determine that a failure has occurred in the storage amount detector 375.

Figure 18:
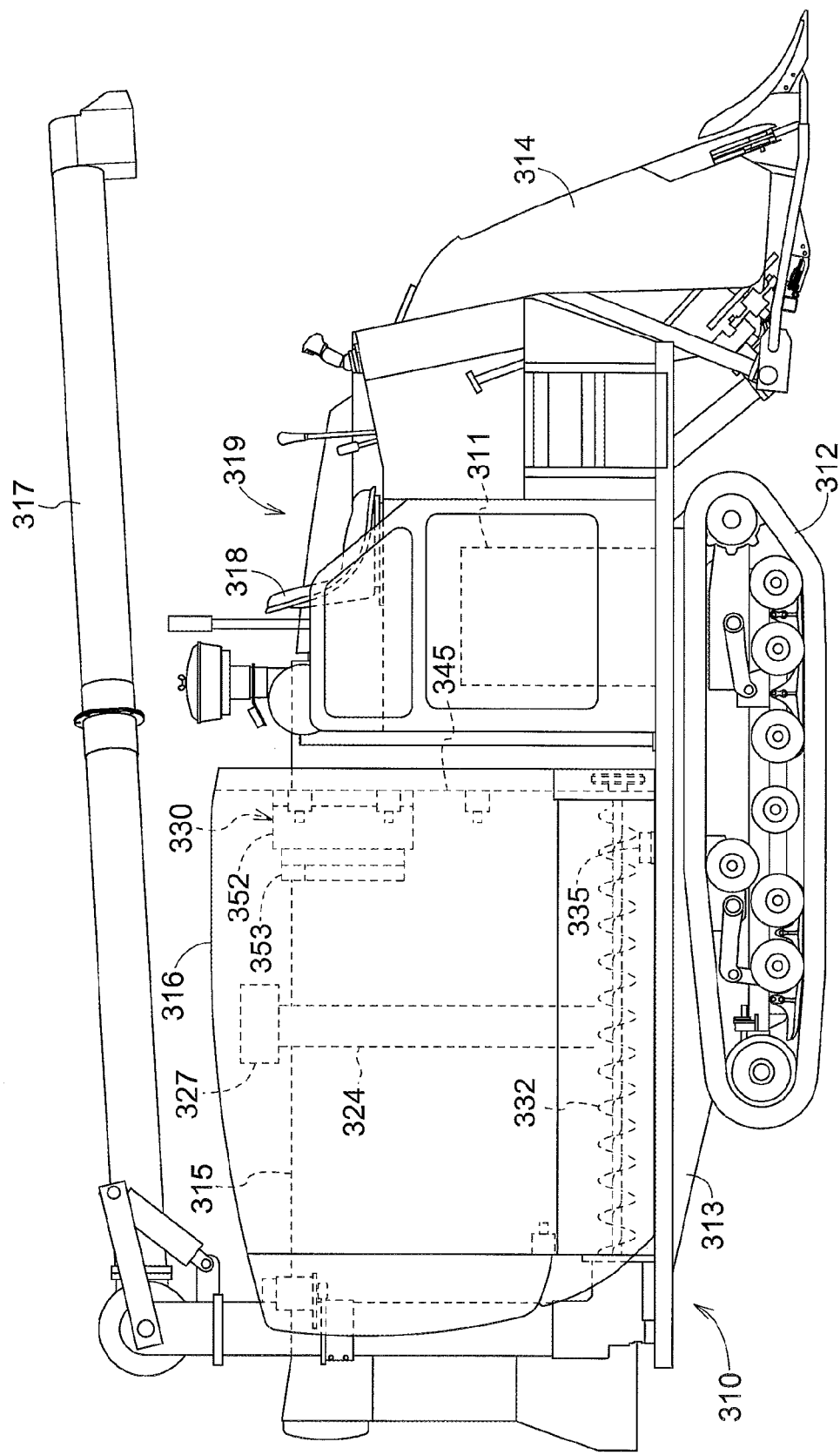
FIG. 18 is a side view of the combine.
Figure 19:
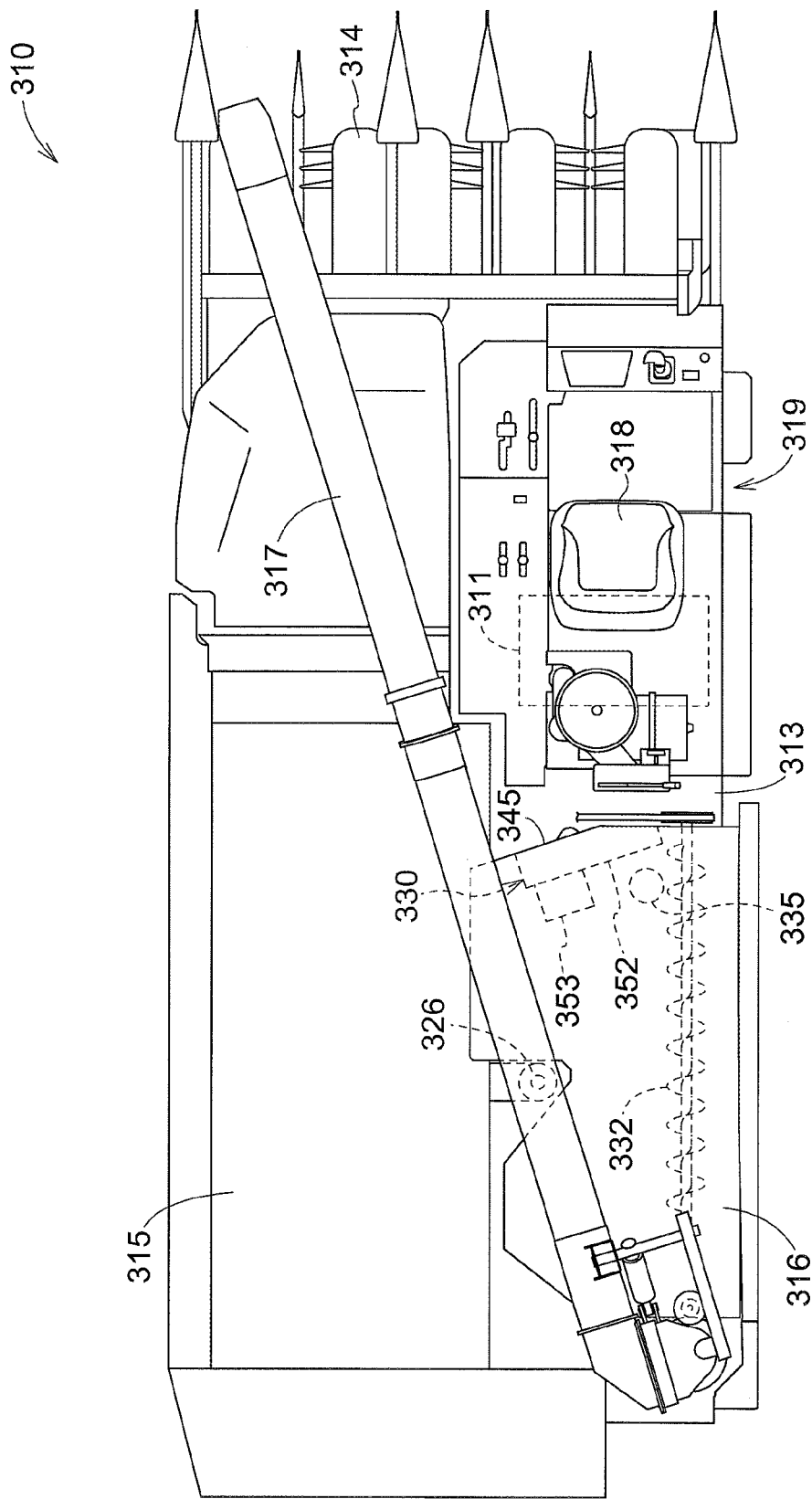
FIG. 19 is a plan view of the combine.

Next, one specific embodiment of the combine will be described with reference to the drawings. FIG. 18 is a side view of a crawler travelling head-feeding type combine, and FIG. 19 is a plan view of the same. This combine includes a travelling machine body 310 that is configured to travel using a pair of right and left crawler travelling apparatuses 312 that are driven by an engine 311. The combine includes: a reaping part 314 that is supported on a front part of a machine body frame 313 of the travelling machine body 310 and reaps planted stalks; a threshing apparatus 315 that performs threshing processing on the reaped stalks; the grain tank 316 that stores grain that has undergone threshing by the threshing apparatus 315; an unloader 317 that is a grain discharge apparatus that discharges grain in the grain tank 316 to the outside; and a driving and manipulation part 319 that includes, for example, a driver's seat 318 on which the driver can sit.

Figure 20:
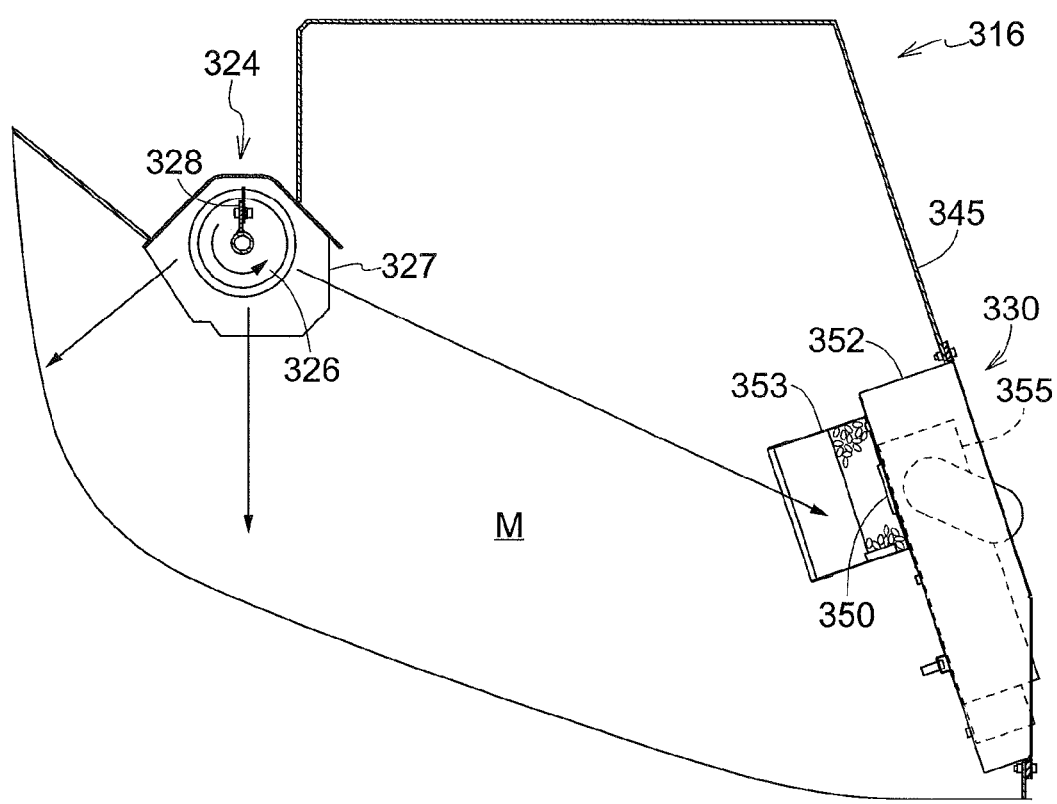
FIG. 20 is a plan view in transverse section showing a front part of a grain tank that is mounted on the combine.

As shown in FIGS. 18 and 19, the grain tank 316 is located on the right side of the threshing apparatus 315 on the machine body frame 313 relative to the machine body, and is located rearward of the engine 311. A grain elevator apparatus 324 is provided on the left side of the grain tank 316. The grain elevator apparatus 324 is located within the grain tank 316, on the left side relative to the machine body. As shown in FIGS. 18, 19 and 20, the grain elevator apparatus 324 lifts grain that has been transported to the threshing apparatus 315, to the inlet port 327, using a lifting screw 326. Grain that has been lifted to the inlet port 327 is flipped by a rotary vane 328 that is provided integrally with the lifting screw 326 that is driven to rotate in a counter-clockwise direction, flies and disperses over a wide area within the grain tank 316, and falls down. A large portion of the grain supplied from the inlet port 327 is supplied to an internal space M within the grain tank 316. Some of the grain supplied from the inlet port 327 is supplied to the measurement unit 330 that is provided on a front part of the grain tank 316 and that performs the quality measurement of the grain stored in the grain tank 316. Thus, grain that has been transported from the threshing apparatus 315 is stored in the grain tank 316.

As shown in FIGS. 18, 19 and 20, a discharging auger 332 that is orientated in the front-rear direction of the machine body and that is configured to discharge grain stored in the grain tank 316 to the outside is provided in a bottom part of the grain tank 316. The discharging auger 332 operates by being driven by a drive force of the engine 311. The grain stored in the grain tank 316 is discharged by the discharging auger 332 from a rear part of the grain tank 316, and is discharged to the outside via the unloader 317 shown in FIGS. 17 and 18.

As shown in FIGS. 18 and 19, a load cell that is configured to measure the yield of grain in the grain tank 316 based on the weight of the grain tank 316 is provided as the yield measuring device 335, at a position below the front part of the grain tank 316.

Figure 21:
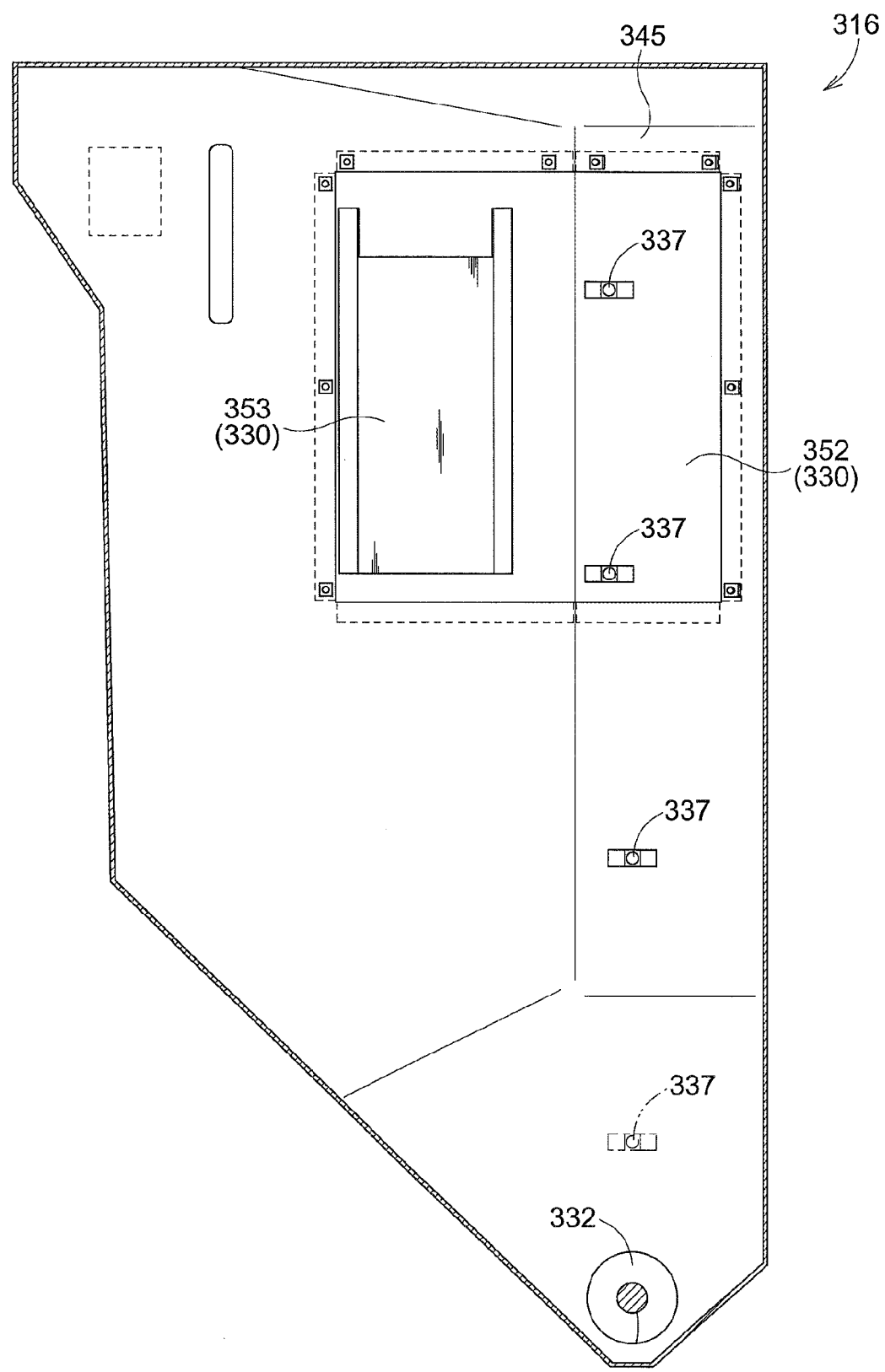
FIG. 21 is a schematic diagram showing an inside of the grain tank.

As shown in FIG. 21, level sensors 337 that detect the level of the accumulated grain in the grain tank 316 is provided in the grain tank 316. The level sensors 337 are constituted by four level sensors that are orientated in a bottom-to-top direction.

Figure 23:
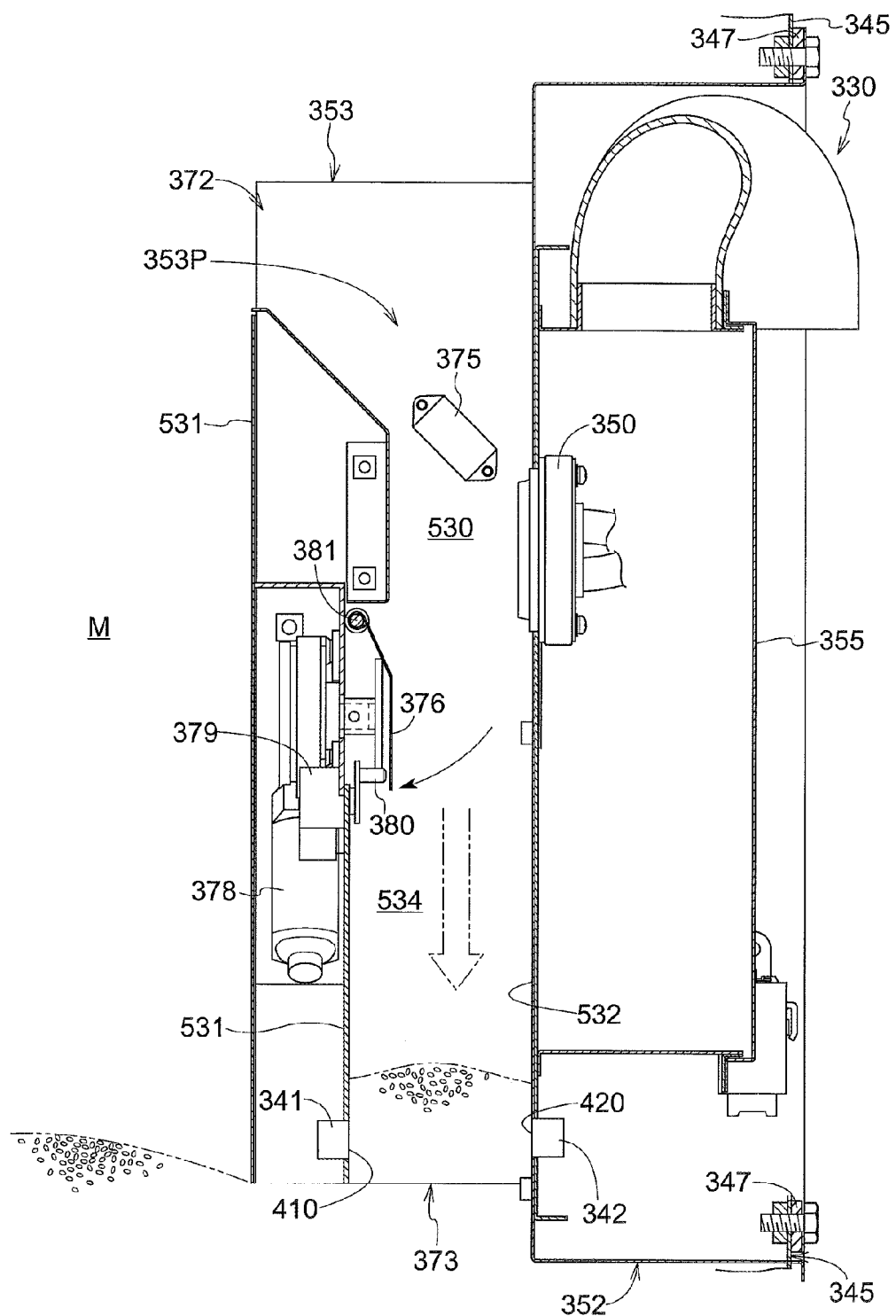
FIG. 23 is a side view in vertical section of the measurement unit when the storage shutter is at an open position.
Figure 24:
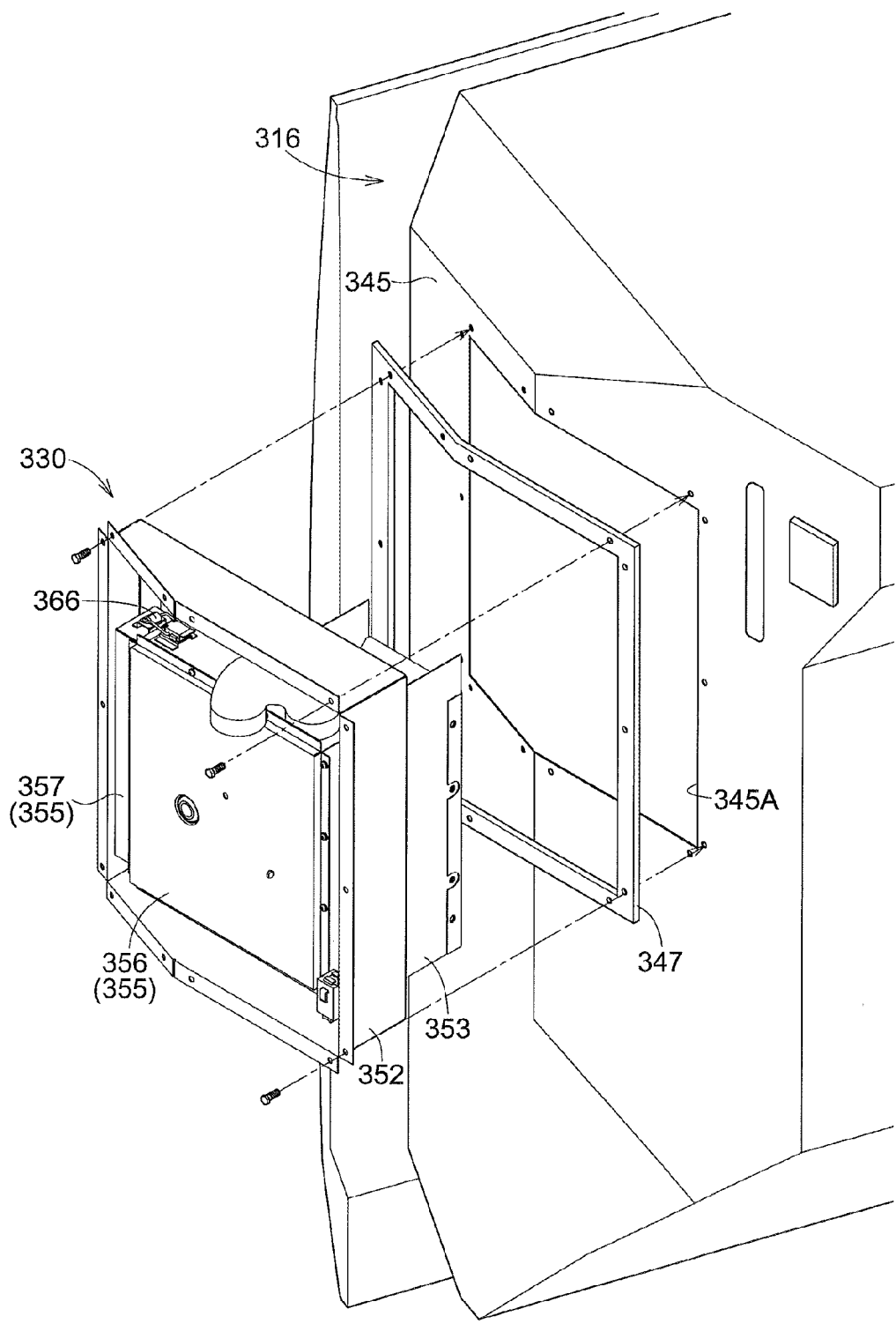
FIG. 24 is a diagram illustrating how to attach the measurement unit to the grain tank.

As shown in FIG. 24, the measurement unit 330 is fixed by being fitted into an attachment hole 345A in a front wall 345 of the grain tank 316 with a vibration-proof rubber 347 for sealing being interposed therebetween. The measurement unit 330 includes the tube-shaped member 353 and the quality measurement part 305. As shown in FIGS. 20 to 23, the quality measurement part 305 includes a measurement chamber housing 352 that has a box shape and into which a quality sensor 350 that measures the quality of grain is built. The tube-shaped member 353 includes the temporary storage part 530A for temporarily storing grain that is to be subjected to the quality measurement by the quality sensor 350.

As shown in FIG. 24, a chassis 355 that houses the quality sensor 350 is attached to the measurement chamber housing 352. The chassis 355 houses a main body case 356 that houses the quality sensor 350, and a filter case 357 that is attachable to and detachable from the main body case 356. The filter case 357 is configured to be detachably coupled to the main body case 356 by coupling members 366 that are of a buckle type. The coupling members 366 are respectively provided on an upper end part and a lower end part of the main body case 356, and are configured to be coupled to and decoupled from an upper end part and a lower end part of the filter case 357.

Figure 22:
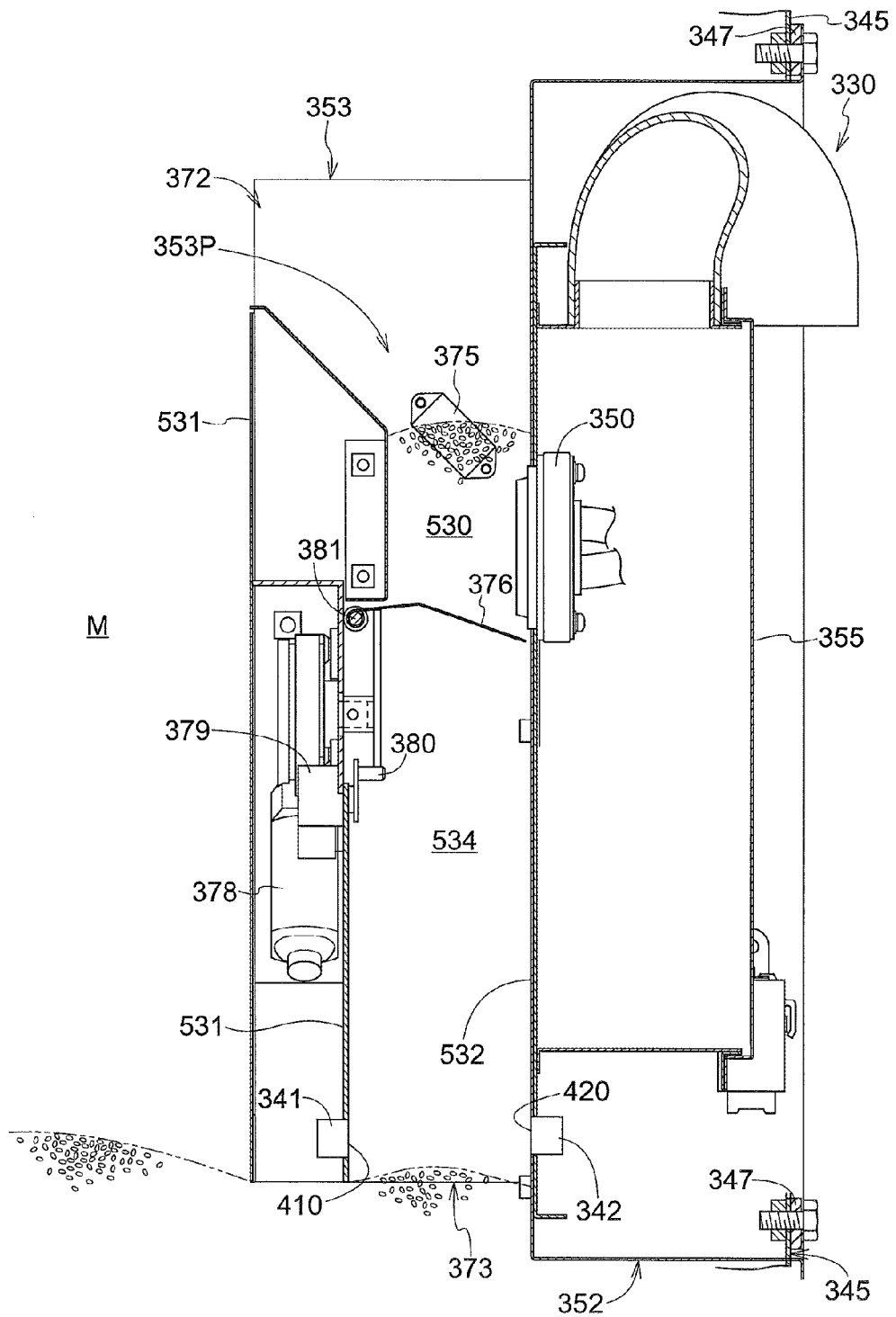
FIG. 22 is a side view in vertical section of a measurement unit when a storage shutter that is provided inside a tube-shaped member that is provided for the grain tank is at a closed position.

As shown in FIGS. 22 and 23, the tube-shaped member 353 is a tube-shaped member that has a rectangular cross section and is constituted by a first wall 531 that faces the internal space M of the grain tank 316, a pair of right and left side walls 533, and a second wall 532 that faces the quality measurement part 305. Note that, in the present embodiment, a vertical plate part that faces the internal space M of the measurement chamber housing 352 serves as the second wall 532. As a matter of course, the second wall 532 may be individually provided. Due to such a configuration of the tube-shaped member 353, the grain path 353P that extends vertically is created inside the tube-shaped member 353, and the temporary storage part 530A is formed halfway of the grain path 353P. The grain path 353P has the inlet port 372 at an upper part, from which grain is taken in, and the discharge port 373 at a lower part, from which grain is discharged.

As shown in FIGS. 22 and 23, the temporary storage part 530A is configured to temporarily store some of the grain that has been transported from the threshing apparatus 315 and flipped by the rotary vane 328. The temporary storage part 530A is configured to take in and temporarily store some of the grain that has been transported from the threshing apparatus 315 via the inlet port 372 that is formed in the upper part of the temporary storage part 530A, and to discharge the grain stored in the temporary storage part 530A from the discharge port 373 formed in the lower part of the temporary storage part 530A to the internal space M of the grain tank 316. In the upper part of the temporary storage part 530A, the storage amount detector 375 that is constituted by a proximity sensor that detects grain is provided on a side wall 533 of the tube-shaped member 353. The storage shutter 376 that closes or opens the discharge port 373 is provided in the lower part of the temporary storage part 530A. The quality sensor 350 that detects the quality of the grain stored in the temporary storage part 530A faces the temporary storage part 530A.

As shown in FIGS. 22 and 23, a discharge number securing area 534 is formed as a part of the grain path 353P so as to be located below, and adjacent to, the storage shutter 376. Therefore, the discharge number securing area 534 is different from that internal space M of the grain tank 316 in terms of the degree of grain accumulation. The grain level detector 341 that has been described in detail with reference to FIG. 16 is provided on the first wall 531 in a lower end area of the discharge number securing area 534. The discharge number securing area 534 is configured to have a volume that is greater than, preferably twice or more of, the volume of grain that can be temporarily stored above the storage shutter 376. The grain level detector 341 is located such that a detection surface 410 thereof is flush with the inner surface of the tube-shaped member 353, specifically the inner surface of the first wall 531. A second grain level detector 342 is provided on the second wall 532, and a detection surface 420 thereof is also flush with the inner surface of the tube-shaped member 353, specifically the inner surface of the second wall 532.

As shown in FIGS. 22 and 23, after the measurement unit 330 has been fixed by being fitted into the grain tank 316, the quality sensor 350 is located inside the grain tank 316. That is, the quality sensor 350 is located inside the grain tank 316. The quality sensor 350 measures the quality of grain stored in the grain tank 316. The quality sensor 350 measures the quality of grain that is temporarily stored in the temporary storage part 530A. The quality sensor 350 employs an optical detection method, and is configured to perform contactless measurement of the quality inside a static grain, such as a moisture value and a protein value.

The storage shutter 376 is configured to have a plate shape and to be swingable. The storage shutter 376 is moved between: a closed position for storing, at which the storage shutter 376 takes on a horizontal orientation; and a closed position for discharging, at which the storage shutter 376 takes on a downward vertical position, by a switching mechanism 380 that is driven by a motor 378 and is constituted by a cam or the like. The storage shutter 376 swings about a pivot shaft 381 that is orientated in a lateral direction that intersects the direction in which the storage shutter 376 opens and closes. The pivot shaft 381 is supported on the first wall 531 of the tube-shaped member 353.

Figure 25:
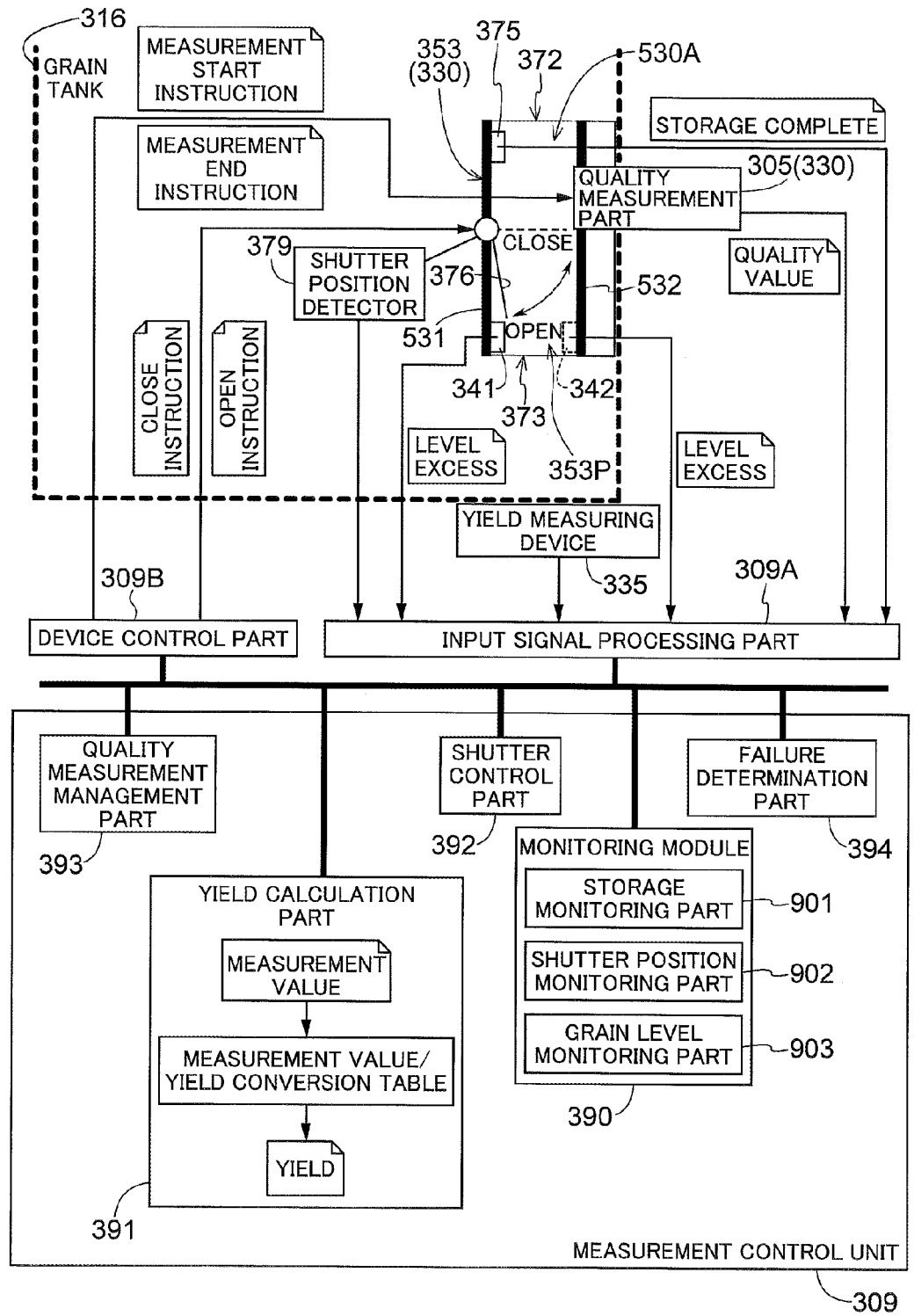
FIG. 25 is a functional block diagram of a measurement control system that is built in the combine.

FIG. 25 is a functional block diagram of a measurement control system that is built in the combine. This functional block diagram shows: detectors that are provided in the measurement unit 330; the measurement control unit 309 that is a core element of the measurement control system; an input signal processing part 309A that is a data input interface; and a device control part 309B that controls various operation devices. The measurement control unit 309, the input signal processing part 309A and the device control part 309B are connected to one another via an on-board LAN or other data transmission lines. The measurement control unit 309 uses the basic principle of measurement control that has been described with reference to FIG. 16 and the basic principal of failure determination that has been described with reference to FIG. 17.

A measurement value signal from the yield measuring device 335, quality value data from the quality measurement part 305, a storage complete signal from the storage amount detector 375, a shutter position signal from the shutter position detector 379, and level excess signals from the first grain level detector 341 and the second grain level detector 342 are inputted to the input signal processing part 309A. Furthermore, signals from switches that relate to measurement control, such as a measurement start switch (not shown), are also inputted to the input signal processing part 309A. The signals inputted to the input signal processing part 309A are subjected to necessary pre-processing, and are transferred to the measurement control unit 309.

The device control part 309B provides an open instruction and a close instruction to various operation devices that are controlled by the measurement control unit 309, such as the storage shutter 376; and provides a measurement start instruction and a measurement end instruction to the quality measurement part 305.

In the measurement control unit 309, a monitoring module 390, a yield calculation part 391, the shutter control part 392, a quality measurement management part 393, and the failure determination part 394 are substantially built as software. The monitoring module 390 has a functional part that receives signals from various detectors via the input signal processing part 309A, and monitors various states of the measurement control that has been described with reference to FIGS. 16 and 17. For example, a storage monitoring part 901 monitors the storage state of grain in the temporary storage part 530A based on a signal from the storage amount detector 375. A shutter position monitoring part 902 monitors which of the closed position for storing and the open position for discharging the storage shutter 376 is located, based on a signal from the shutter position detector 379. A grain level monitoring part 903 monitors the upper surface level of the grain that came from the discharge port 373 of the tube-shaped member 353, based on signals from the grain level detectors 341, 342.

A yield calculation part 391 calculates the yield based on a measurement value signal from the yield measuring device 335 that is the load cell, using the measurement value/yield conversion table. Note that, in the present embodiment, the yield calculation part 391 has the function of calculating the amount of an increase in the yield from a specified start time to a specified end time, based on the yield calculated using a predetermined sampling time.

The quality measurement management part 393 instructs the quality measurement part 305 to start measurement or end measurement, in conjunction with the shutter control part 392 and the monitoring module 390. In addition, the quality measurement management part 393 has the function of recording the amounts of the water component and the protein component in a grain calculated based on the quality value data from the quality measurement part 305, and a specific point in the farm field obtained based on the travelling trajectory data of the combine, in association with each other.

The failure determination part 394 has the function of performing the failure determination with respect to the storage amount detector 375 as described above with reference to FIG. 17, in conjunction with the monitoring module 390 and the yield calculation part 391. This function is the same as that described above, and therefore a description thereof is omitted here.

Other Embodiments Modified from Third Embodiment (1) In the above-described embodiment, proximity sensors are used as the storage amount detector 375 and the grain level detectors 341, 342. However, the proximity sensors are is not essential, and contact type sensors or the like may be used instead, insofar as grain can be detected.

In the above-described embodiment, the two grain level detectors 341, 342 are provided at the same level of height, and the predetermined value, serving as a reference value for detecting that the below-shutter distance has been reached, is the same between the two grain level detectors 341, 342. Alternatively, the two grain level detectors 341, 342 may be provided at different levels of height; and a predetermined value, that serves as a reference value for detecting that the below-shutter distance of the first grain level detector 341 has been reached, may be different from a predetermined value that serves as a reference value for detecting that the below-shutter distance of the second grain level detector 342 has been reached.

(2) In the above-described embodiment, a capacity for the tube-shaped member 353 is secured approximately twice as much as the amount of grain that can be stored in the temporary storage part 530A from the lower end of the storage shutter 376 at the open position for discharging to the discharge port 373. However, the tube-shaped member 353 may be shortened to have a length that is sufficient for providing the grain level detector 341 at the lower end of the storage shutter 376 at the open position for discharging.

(3) In the above-described embodiment, the tube-shaped member 353 and the quality measurement part 305 are coupled to each other and integrated into a single structure. However, they may be separate structures that are independent of each other.

(4) The way to partition the functional parts as shown in FIG. 25 is described as an example only, and the functional parts may be integrated or divided as appropriate. Any configuration may be employed insofar as the control functions of the present invention can be realized, and the functions may be realized using hardware, software or both.

INDUSTRIAL APPLICABILITY

The present invention is applicable to combines, and is also applicable to crop harvesting machines such as corn harvesting machines. Combines include, in addition to the head-feeding type combines that have been described in the embodiments, normal type combines (also referred to as whole stalk charging type combines). Also, combines include, in addition to the crawler travelling type combines shown in the embodiments, wheel travelling type combines.

DESCRIPTION OF REFERENCE SIGNS

First Embodiment
2: Measurer
8: Unloader apparatus
9: Grain tank (Crop tank)
20: Load cell
30: Manual operation device
31: Simplified measurement switch
32: Precise measurement switch
51: Operational instruction processing part
54: Measurement result recording part
62: Device control part
521: Simplified measurement execution part
522: Precise measurement execution part
153A: Yield conversion table
Second Embodiment
20: Load cell
101: Travelling machine body
108: Unloader apparatus
109: Grain tank (Crop tank)
115: Threshing apparatus
152: Horizontal orientation control part
153: Yield measurement part
154A: Memory
155: Zero point adjustment part
182: Vertical transport screw conveyer
183: Horizontal transport screw conveyer
187: Holding apparatus
200: Orientation changing mechanism
201: Supporting metal
Third Embodiment
305: Quality measurement part
315: Threshing apparatus
316: Grain tank
317: Unloader
335: Yield measuring device
341: Grain level detector (First grain level detector)
342: Second grain level detector
352: Measurement chamber housing
353: Tube-shaped member
372: Inlet port
373: Discharge port
375: Storage amount detector
376: Storage shutter
379: Shutter position detector
392: Shutter control part
394: Failure determination part
410: Detection surface
420: Detection surface
530A: Temporary storage part
531: First wall
532: Second wall

What is claimed is:

1. A harvesting machine comprising:
a crop tank that temporarily stores crop that the harvesting machine has harvested while travelling over a farm field;
a measuring device that measures an amount of crop that has been stored in the crop tank;
an unloader apparatus that discharges the stored crop out of the crop tank;
a device control part that executes precise measurement oriented device setting processing to create a device state that allows the measuring device to perform precise measurement;
a measurement control part, the measurement control part including: a precise measurement execution part that performs, by the measuring device, precise measurement which involves the precise measurement oriented device setting processing; and a simplified measurement execution part that executes, by the measuring device, simplified measurement which does not involve the precise measurement oriented device setting processing;
an operational instruction processing part that outputs a precise measurement instruction to perform the precise measurement and a simplified measurement instruction to perform the simplified measurement, in response to an operation performed by using a manual operation device; and
a measurement result recording part that, before the unloader apparatus performs crop discharging work, rewrites a simplified measurement result that has been recorded based on a preceding simplified measurement instruction, with a precise measurement result that is based on a succeeding precise measurement instruction.

2. The harvesting machine according to claim 1, wherein the manual operation device includes a simplified measurement switch that sends out a signal for outputting a simplified measurement instruction to the operational instruction processing part, and a precise measurement switch that sends out a signal for outputting a precise measurement instruction to the operational instruction processing part.

3. The harvesting machine according to claim 2, wherein the simplified measurement switch also serves as an activation switch for the unloader apparatus, and a signal for outputting the simplified measurement instruction is sent out upon multiple operations being performed with the activation switch, and a signal that requests activation of the unloader apparatus is sent out upon a single operation being performed with the activation switch.

4. The harvesting machine according to claim 1, wherein, during the precise measurement oriented device setting processing, at least one of: a process of changing an orientation of a vehicle body of the harvesting machine to a horizontal orientation; a process of blocking a driving force to a device for harvesting work; and a process of fixing a device for unloading work at a storage position is executed.

5. The harvesting machine according to claim 1, wherein a conversion table for deriving a yield that is the amount of crop that has been stored in the crop tank, from a measurement value obtained by the measuring device, is built based on data that is transmitted from a management center via a data communication network in response to identification information regarding a farm field that is a harvesting target.

6. The harvesting machine according claim 1, further comprising:
a display part that displays: a unit yield obtained at each instance of unload work, the unit yield being an amount of crop that has been stored in the crop tank and being calculated from a result of measurement performed by the measuring device; and an integrated yield per farm field, the integrated yield being an integration of unit yields.

7. A combine comprising:
a travelling machine body;
an orientation changing mechanism that changes an orientation of the travelling machine body;
a grain tank that is mounted on the travelling machine body and stores grain that has been transported from a threshing apparatus;
an unloader apparatus that discharges grain that has been stored in the grain tank to an outside from a bottom part of the grain tank;
a load cell that measures a weight of the grain tank;
a yield measurement part that measures a yield of grain that has been stored in the grain tank, based on a result of measurement performed by the load cell;
a zero point adjustment part that performs zero point adjustment processing for the yield measurement part; and
a horizontal orientation control part that controls the orientation changing mechanism upon zero point adjustment processing being started by the zero point adjustment part, so as to bring the travelling machine body into a horizontal orientation.

8. The combine according to claim 7,
wherein the unloader apparatus includes: a bottom part screw that is provided on the bottom part of the grain tank; a vertical transport screw conveyer that conveys grain that has been exported by the bottom part screw, in an upward direction; and a horizontal transport screw conveyer that is swingable in a top-bottom direction relative to the vertical transport screw conveyer, the unloader apparatus further including a holding apparatus that fixes the horizontal transport screw conveyer at a home position, and
the holding apparatus fixes the horizontal transport screw conveyer at the home position upon the zero point adjustment processing being started by the zero point adjustment part.

9. The combine according to claim 8,
wherein the horizontal transport screw conveyer uses hydraulic pressure to swing in the top-bottom direction, and the holding apparatus uses a gravity fitting method under a condition where hydraulic pressure has been released, to fix the horizontal transport screw conveyer.

10. The combine according to claim 9,
wherein if the horizontal transport screw conveyer is located at the home position when the zero point adjustment processing is started by the zero point adjustment part, the horizontal transport screw conveyer is first caused to swing upward using hydraulic pressure, and is then fixed to the holding apparatus using the gravity fitting method under a condition where hydraulic pressure has been released.

11. The combine according to claim 7,
wherein the horizontal orientation control part controls the orientation changing mechanism upon completion of the zero point adjustment processing, thereby bringing the travelling machine body into a lower limit orientation in which a height of the travelling machine body relative to a ground is the lowest.

12. The combine according to claim 7,
wherein the zero point adjustment processing includes: basic zero point adjustment processing that is performed before factory shipment; temporary zero point adjustment processing that is performed after factory shipment; and a temporary zero point adjustment parameter that is calculated as per the temporary zero point adjustment processing is replaced with a basic zero point adjustment parameter that is calculated as per the basic zero point adjustment processing.

13. The combine according to claim 12,
wherein the basic zero point adjustment parameter is recorded on a memory before being replaced with the temporary zero point adjustment parameter, and the basic zero point adjustment parameter is set again upon the temporary zero point adjustment parameter being reset.

14. A combine comprising:
a grain tank that stores grain that has been transported from a threshing apparatus;
a grain discharging apparatus that discharges grain that has been stored in the grain tank to an outside from a bottom part of the grain tank;
a tube-shaped member that is provided inside the grain tank, and forms a grain path that has: an inlet port that is an upper port for taking in some of the grain that has been transported from the threshing apparatus; and a discharge port that is a lower port for discharging the grain that has been taken in from the inlet port to the grain tank;
a temporary storage part that is located halfway of the grain path;
a storage shutter that is provided for the temporary storage part, and that is movable between: a closed position for storing, at which the storage shutter takes on a horizontal orientation in order to store grain that has been taken in from the inlet port of the temporary storage part; and an open position for discharging, at which the storage shutter takes on a downward orientation in order to discharge the stored grain from the temporary storage part;
a quality measurement part that detects quality of grain that has been stored in the temporary storage part;
a grain level detector that is provided in the grain path and detects that a below-shutter distance has reached a predetermined value, the below-shutter distance being a distance between a lower end of the storage shutter in the downward orientation and an upper surface of the grain that has been stored in the grain tank; and
a shutter control part that controls a position changing operation of the storage shutter, and stops the position changing operation of the storage shutter based on a detection signal from the grain level detector.

15. The combine according to claim 14,
wherein the tube-shaped member has: a first wall that faces toward a central part of the grain tank; and a second wall that faces a wall member of the grain tank, and
the storage shutter is a swing shutter that swings about a swing shaft that is supported by the first wall, and the grain level detector is provided on the first wall.

16. The combine according to claim 15,
wherein the grain level detector has a detection surface that is flat, and the grain level detector is provided such that the detection surface is flush with the first wall.

17. The combine according to claim 14, further comprising:
a second grain level detector that is provided in the grain path and detects that the below-shutter distance has reached another predetermined value that is different from the predetermined value.

18. The combine according to claim 14, further comprising:
a second grain level detector that is provided in the grain path and detects that the below-shutter distance has reached a predetermined value that is the same as the predetermined value.

19. The combine according to claim 17,
wherein the grain level detector and the second grain level detector are provided in the grain path facing each other.

20. A combine comprising:
a grain tank that stores grain that has been transported from a threshing apparatus;
a grain discharging apparatus that discharges grain that has been stored in the grain tank to an outside from a bottom part of the grain tank;
a grain path that is provided inside the grain tank, and has: an inlet port that is an upper port for taking in some of the grain that has been transported from the threshing apparatus; and a discharge port that is a lower port for discharging the grain that has been taken in from the inlet port to the grain tank;
a temporary storage part that is located halfway of the grain path;
a storage shutter that is provided for the temporary storage part, and that is movable between: a closed position for storing, at which the storage shutter stores the grain that has been taken in from the inlet port of the temporary storage part; and an open position for discharging, at which the storage shutter discharges the stored grain from the temporary storage part;
a storage amount detector that outputs a storage complete signal upon an amount of grain that has been stored in the temporary storage part reaching a predetermined amount;
a quality measurement part that detects quality of grain that has been stored in the temporary storage part;
a shutter control part that controls a position changing operation of the storage shutter;
a yield measuring device that measures a yield of grain that is stored in the grain tank; and
a failure determination part that determines that a failure has occurred in the storage amount detector, based on a fact that the storage amount detector has not outputted the storage complete signal, despite the amount of grain that has been stored in the temporary storage part, estimated based on a result of measurement by the yield measuring device, having exceeded the predetermined amount.

21. The combine according to claim 20, further comprising:
a shutter position detector that detects a positional change of the storage shutter, wherein the failure determination part determines that a failure has occurred in the storage amount detector based on a result of measurement over time by the yield measuring device and a result of detection by the shutter position detector.

22. The combine according to claim 21,
wherein the failure determination part determines that a failure has occurred in the storage shutter, based on a fact that the shutter position detector has not detected a positional change of the storage shutter despite a control signal that instructs the storage shutter to perform a position changing operation being outputted from the shutter control part.

23. The combine according to claim 21,
wherein the failure determination part determines that a failure has occurred in the storage amount detector, based on a fact that an increase in the yield, from when the storage shutter was moved to the closed position for storing, has reached a predetermined amount.

24. The combine according to claim 20,
wherein the failure determination part determines that a failure has occurred in the storage amount detector, based on a fact that the storage amount detector continues outputting the storage complete signal despite the storage shutter having moved from the closed position for storing to the open position for discharging.

* * * * *

UNITED STATES PATENT AND TRADEMARK OFFICE
CERTIFICATE OF CORRECTION

PATENT NO. : 9,974,233 B2  
APPLICATION NO. : 15/315522  
DATED : May 22, 2018  
INVENTOR(S) : Mao Ueda et al.

Page 1 of 1

It is certified that error appears in the above-identified patent and that said Letters Patent is hereby corrected as shown below:

On the Title Page

Item (*) Notice Column 1, Line 3, after "0 days." delete "days."

In the Claims

Column 36, Line 62, Claim 6, after "according" insert -- to --

Signed and Sealed this  
Twenty-first Day of August, 2018

Andrei Iancu  
*Director of the United States Patent and Trademark Office*